(12) United States Patent
Paink et al.

(10) Patent No.: US 11,891,486 B2
(45) Date of Patent: Feb. 6, 2024

(54) SIDE CHAIN FUNCTIONALIZED ORGANOSILOXANE POLYMERS, COATING COMPOSITIONS AND ICE-PHOBIC COATINGS THEREOF

(71) Applicant: ADAPTIVE SURFACE TECHNOLOGIES, INC., Cambridge, MA (US)

(72) Inventors: Gurminder Kaur Paink, Hopkington, MA (US); Grant William Tremelling, Hopkington, MA (US); Chetan Anirudh Khatri, Hopkington, MA (US); Teluka Pasan Galhenage, Hopkington, MA (US)

(73) Assignee: Adaptive Surface Technologies, Inc., Hopkington, MA (US)

( * ) Notice: Subject to any disclaimer, the term of this patent is extended or adjusted under 35 U.S.C. 154(b) by 0 days.

(21) Appl. No.: 17/784,613

(22) PCT Filed: Dec. 11, 2020

(86) PCT No.: PCT/US2020/064671
§ 371 (c)(1),
(2) Date: Jun. 10, 2022

(87) PCT Pub. No.: WO2021/119530
PCT Pub. Date: Jun. 17, 2021

(65) Prior Publication Data
US 2023/0042027 A1   Feb. 9, 2023

Related U.S. Application Data

(60) Provisional application No. 62/946,944, filed on Dec. 11, 2019.

(51) Int. Cl.
| | | |
|---|---|---|
| *C09C 1/30* | (2006.01) | |
| *C08G 77/46* | (2006.01) | |
| *C08G 77/20* | (2006.01) | |
| *C08G 77/392* | (2006.01) | |
| *C08G 77/395* | (2006.01) | |
| *C09D 183/04* | (2006.01) | |

(52) U.S. Cl.
CPC ............ *C08G 77/46* (2013.01); *C08G 77/20* (2013.01); *C08G 77/392* (2013.01); *C08G 77/395* (2013.01); *C09C 1/3072* (2013.01); *C09C 1/3081* (2013.01); *C09D 183/04* (2013.01)

(58) Field of Classification Search
None
See application file for complete search history.

(56) References Cited

U.S. PATENT DOCUMENTS

| | | | |
|---|---|---|---|
| 2005/0271948 A1 | 12/2005 | Kang et al. | |
| 2007/0190306 A1 * | 8/2007 | Herrwerth | C08G 77/50 |
| | | | 428/307.3 |

FOREIGN PATENT DOCUMENTS

| | | | |
|---|---|---|---|
| CA | 2658447 | * | 2/2008 |
| JP | 2004-256586 | * | 9/2004 |
| WO | 2019/237093 A1 | | 12/2019 |
| WO | 2020/005840 A1 | | 1/2020 |

OTHER PUBLICATIONS

Machine translation of JP 2004-256586 (no date).*
Bayer Baysilone Fluids Brochure (no date).*
Koestrosol AS2040 product data sheet (no date).*
Hou Zhaosheng et al: "Polysiloxanes with Quaternary Ammonium and Polyether Groups for Silyl-Terminated Polypropylene Oxide Waterborne Emulsions", Journal of Surfactants and Detergents, Springer, Berlin, DE, vol. 19, No. 4, May 9, 2016 (May 9, 2016), pp. 739-745, XP035981825, ISSN: 1097-3958, DOI: 10.1007/S11743-016-1825-8 [retrieved on May 9, 2016].

* cited by examiner

*Primary Examiner* — Marc S Zimmer
(74) *Attorney, Agent, or Firm* — Johnson, Marcou, Isaacs & Nix, LLC

(57) ABSTRACT

The disclosure relates to sidechain functionalized organosiloxane compounds comprising polyalkyleneoxide (POA) and/or polyalkyleneoxide coupled zwitterionic moieties with various other modular side chains including reactive and or non-reactive groups. The present disclosure further also pertains to ice-phobic polymer formulations capable of curing on a substrate to form a surface that is ice-phobic, resistant to ice formation, and/or resistant to ice adhesion. The disclosed ice-phobic polymer formulations comprise one or more disclosed sidechain functionalized organosiloxane compound, one or more binder resin, and/or one or more lubricating liquid. The present disclosure further relates to articles comprising the disclosed ice-phobic polymer compositions, thereby providing articles having ice-phobic properties. This abstract is intended as a scanning tool for purposes of searching in the particular art and is not intended to be limiting of the present disclosure.

21 Claims, 20 Drawing Sheets

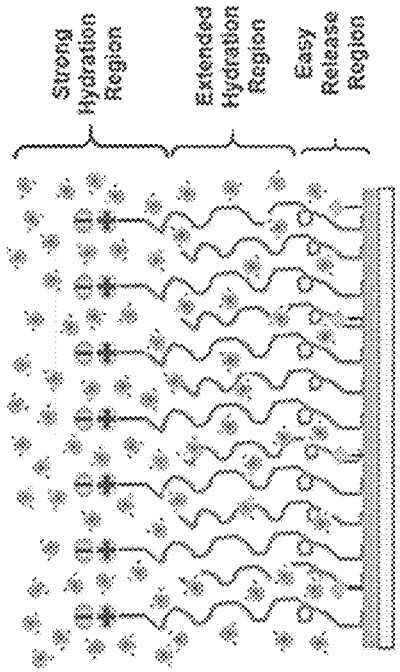
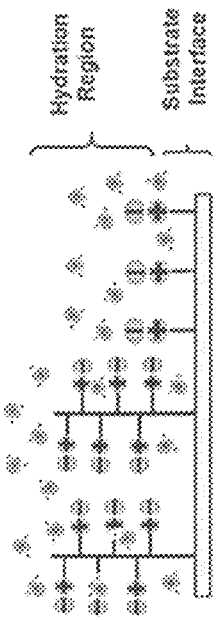
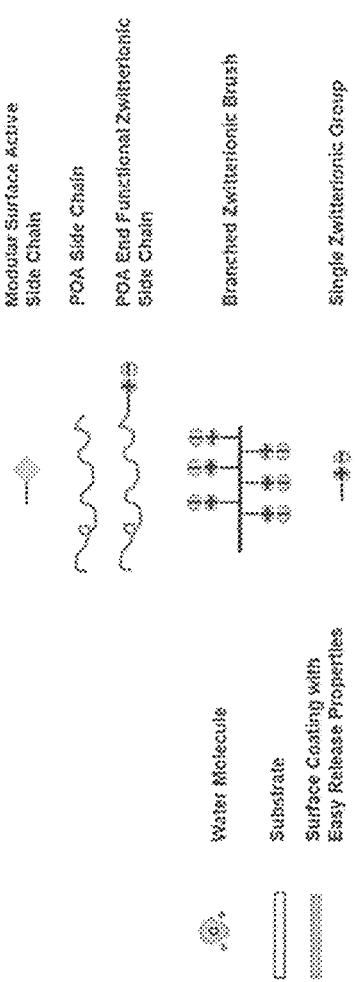
FIG. 1A
FIG. 1B
FIG. 1C

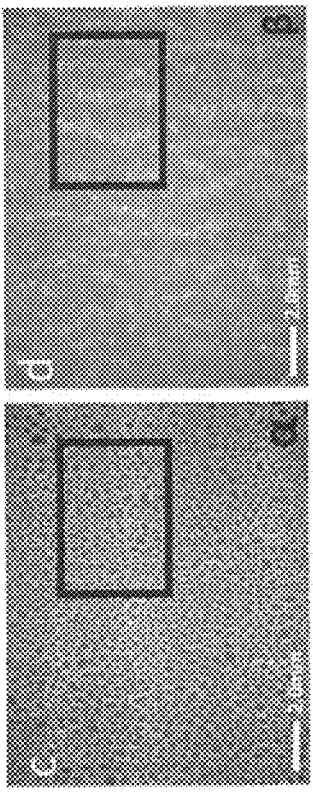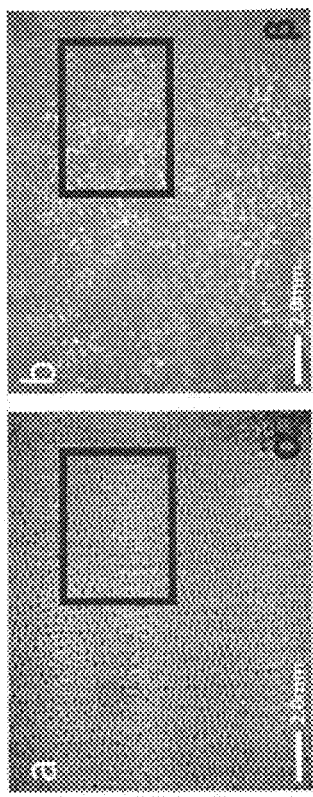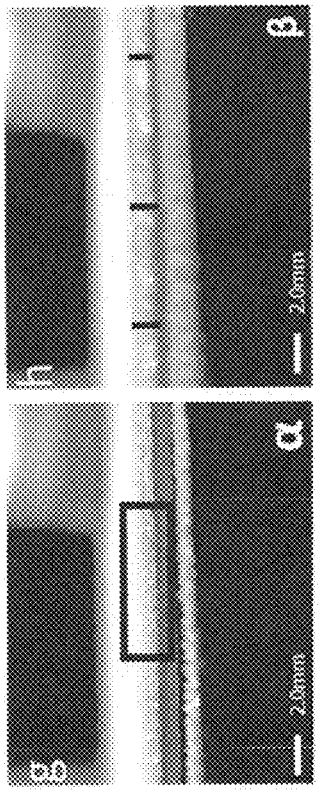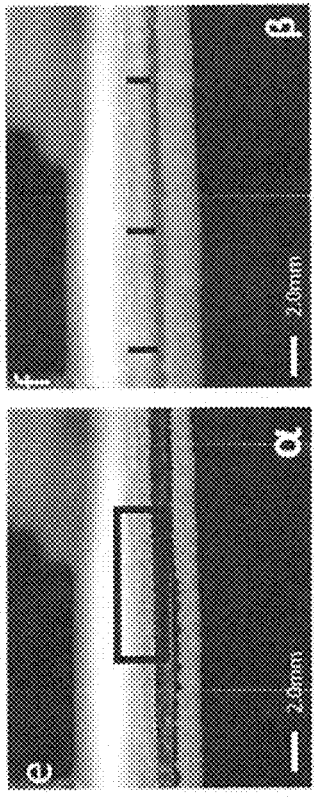

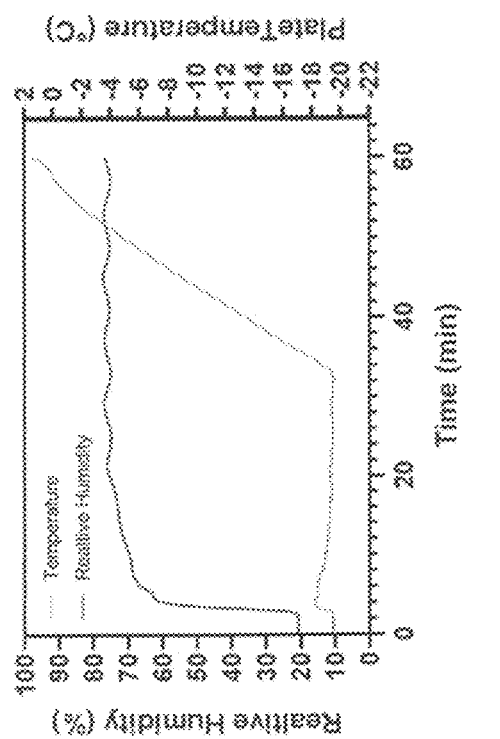
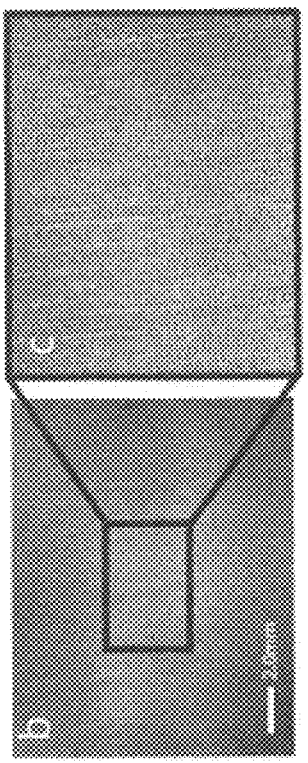
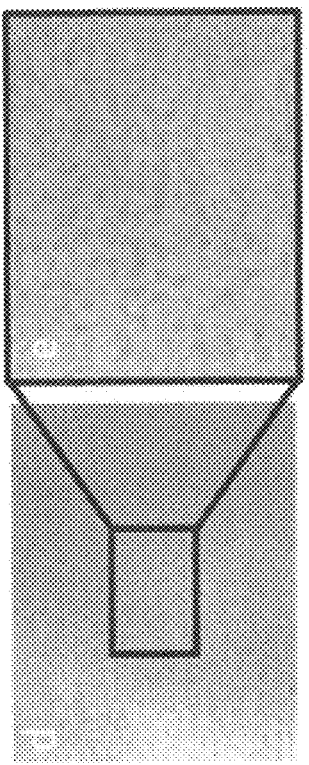
FIG. 10A
FIG. 10B
FIG. 10C
FIG. 10D
FIG. 10E

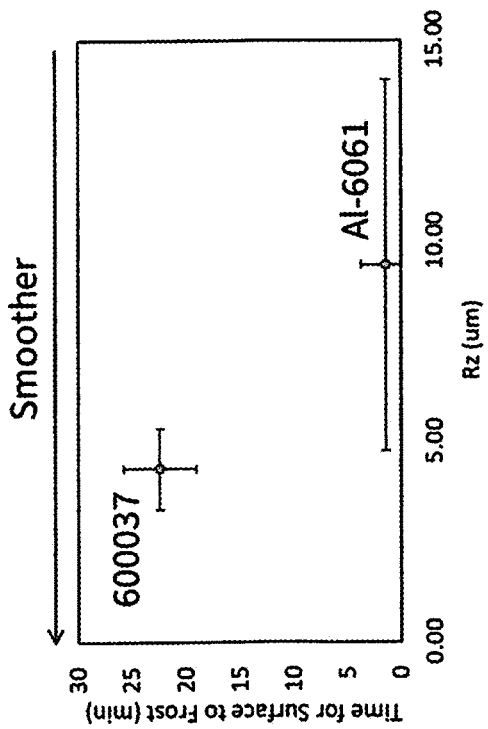
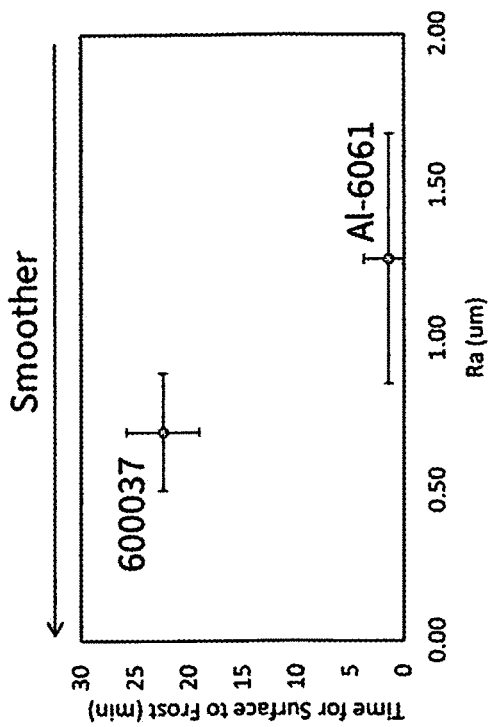
FIG. 17A
FIG. 17B

SIDE CHAIN FUNCTIONALIZED ORGANOSILOXANE POLYMERS, COATING COMPOSITIONS AND ICE-PHOBIC COATINGS THEREOF

CROSS-REFERENCE TO RELATED APPLICATIONS

This Application is the 35 U.S.C. § 371 national stage application of PCT Application No. PCT/US2020/064671, filed Dec. 11, 2020, where the PCT claims priority to, and the benefit of U.S. Provisional Application No. 62/946,944, filed on Dec. 11, 2019, each of which is incorporated herein by reference in its entirety.

TECHNICAL FIELD

The present disclosure generally relates to coatings and surfaces, and in particular to coatings and surfaces that are ice-phobic.

BACKGROUND

Ice formation and accumulation on surfaces poses a great deal of concern to energy supply and transportation industries (Ref. 1). Frosting in refrigerators cause increased energy consumption, icing on aircrafts can cause life threatening accidents, ice buildup on power cable can lead to detached powerlines disrupting power supply during winter months, and icing on exposed functional or telecommunication equipment/sensors lead to reduced efficacy.

Several strategies have been explored to keep surfaces clean from ice. These methods include heating through electro-thermal or infrared sources, de-icing using mechanical or anti-freeze liquids, and engineered coatings and surfaces with anti-ice properties. Recent focus has been on engineering a coating or surface to repel ice as it is considered a more energy efficient and sustainable approach. Literature shows researchers have been exploring elasticity, interfacial surface energy phenomenon, Slippery Liquid Infused Porous Surface (SLIPS), amphiphilicity, anti-freezing agents such as proteins, organogels and stimuli responsive surfaces as design principle for creating ice repellency function (Ref. 1).

The traditional thinking of ice-phobic surfaces was believed to be related to surface wetting, roughness and elastic modulus. However, recent studies suggest that ice formation and adhesion is much more complicated and sensitive to surface and environmental factors. These factors have significant yet hard to distinguish effects on ice formation and accumulation. Superhydrophobic coatings and surfaces were initially explored as ice-phobic surfaces. Although they showed initial promise at shedding water droplets that turned into ice (Ref. 2), any event that causes wicking (transition from Cassie Backster state to Wenzel state) leads to loss of superhydrophobicity and increased contact between water and the surface resulting in increased ice-adhesion strengths compared to a smooth surface with the same surface chemistry. High pressure, humidity, vapor deposition, and surface oil contamination all lead to a Wenzel state in the presence of water. Gregory, et al. describe superhydrophobic coatings with ice-phobic properties in EP3006590A1 and they detail a method for forming a hydrophobic coating on a substrate by a thermal spray deposition of polymeric particles. Similarly, US20150252199A1 describes ice-phobic coatings for compressor blades which consists of least one silicon-organic constituent, ceramic particles, boron nitride particles and a solvent and also polytetrafluoroethylene and/or graphite. However, even if the robustness is significantly improved, these coatings still rely on the surface roughness which can be subjected to wicking under challenging environments.

Low surface energy coatings are also explored as ice-phobic surface. Low surface energy polymers and materials such as Polytetrafluoroethylene (PTFE) and polydimethyl siloxane (PDMS) are incorporated into coatings which then create surfaces with surface energy ranging 25-15 Nm. These coating demonstrate high water contact angles, thus low contact area and reduced ionic interaction between ice and the interface leading to high water shedding and low ice removal force. Although low surface energy coatings may have low ice adhesion, they fail to reduce the accumulation of ice. Coatings do not eliminate shedding off any moisture that would condense on the surface which lead to accumulation of water droplets that forms into ice. Thus, such coating systems require integration of additional cleaning mechanisms.

In conventional methods, the use of low surface energy polymers such as silicone and fluoro to create low-surface energy ice-phobic coatings has also been explored. Berry et al. (U.S. Ser. No. 10/266,723B2) describes polyurethane compositions with siloxane polymers a polyisocyanate and/or a polyol, a polyamine and/or reactive coating capable of reducing the ability of ice to adhere to the surface of an object, in particular aircraft or other vehicles. Similarly, U.S. Pat. No. 6,797,795B2 and EP 312279681 describes a surface of a substrate comprising a polysiloxane(amide-ureide) and polysiloxane polyols with acrylic backbone inhibiting ice formation. U.S. Pat. No. 5,045,599A describes anti-icing compositions which present a fluoro/silicone coating with low surface energy and comprised of: a) copolymer made with fluoroolefin; b) a silicone compound; and c) a polyisocyanate.

Slippery Liquid Infused Porous Surfaces (SLIPS) are created using chemically functionalized nanorough surface coating covered with a chemically matched lubricating liquid (Ref. 3). The SLIPS surfaces are extremely smooth due to the lubricant overlayer, any foulants including water that are immiscible with the lubricant will easily slide off. There have been several publications which examine SLIPS for anti-ice applications (Ref. 4). The premise was that the liquid overlayer delays the initial ice nucleation as well as the propensity for ice to adhere to the surface over time. If there is ice accumulation on the surface, the shear force required to remove the ice is significantly less or in the case of temperature cycling the temperature and time for the heating cycling is reduced. Maintaining the liquid overlayer for extended period under harsh environmental conditions may be a challenge for slippery surfaces. Golovin, et al describes low interfacial toughness materials helps to detach ice easily independent of the iced area (Ref. 5). However these coating strategies will require some initiation of crack between the coating ice interface to be effective (Refs. 5-6).

Aizenberg J. et al. (US20180362875A1) have disclosed a method to prepare an article with slippery surface by modifying the metal-containing surface to roughen the metal-containing surface, and disposing a lubricating layer on the roughened metal-containing surface, wherein the lubricating layer is substantially stabilized on the roughened metal-containing surface. The surfaces are extremely smooth and displayed very low ice adhesion values. Similarly, Carter (US20150299503A1) describes immobilizing anti-freeze solution on to an article in which an organic polymer matrix layer is applied to the surface where the organic polymer matrix layer comprises a homopolymer comprising up to 50% porous polymer solids having a pore size of up to 100 Angstroms and being capable of absorbing and chemically bonding an aqueous freeze-point depressant solution in amounts of up to 99.75% by weight. However, these strategies require to replenish the liquid layer on the surface on regular basis. Therefore, the approach could be cost prohibitive depending on the replenishment interval and complexity of the process.

Amphiphlic surfaces are considered to have hydrophobic and hydrophilic chemical moieties on the surface creating a heterogeneous surface morphology. Model amphiphilic coatings has shown to decrease the freezing point of ice and reduce the ice adhesion strength. Upadhyay et al (Ref. 7) demonstrated the amphiphilic surfaces created using PEG-PDMS polymers in polyurethane base coating showed low ice adhesion strength although the tuning of the hydrophilic and hydrophobic balance was critical for reduced adhesion of ice. Rodriguez A. R. et al. presents the combination of low surface energy material and hydrophilic materials for ice-phobic coatings (US20190176188A1). The segmented copolymer comprised of soft segments selected from fluoropolymers, second soft segments selected from polyesters or polyethers, hard segments reacted form of one or more isocyanate species, polyol or polyamine chain extenders. Additionally, the soft and hard segments are phase separated into domains of size 5 to 100 nm.

Furthermore, WO2018001889A1 describes compositions based on polysiloxane where some binder component may have polyether or polyester character showing low ice adhesion values. Several studies have used polyhedral oligomeric silsesquioxane (POSS) and hydrophilic polymers such as poly (sulfobetaine methacrylate) to create ice phobic surfaces. The authors describe a formation of aqueous lubricating layer of tightly bound water which helps to delay ice formation. However, these materials are either expensive or difficult to scale to advance a practical solution for mitigation of icing. U.S. Ser. No. 10/377,91662 describes embodiments that may provide anti-icing coatings with at least one monomeric species exhibiting molecular flexibility. Such species may have zwitterionic character. However, to our knowledge there has been no evidence of surface active polymers with polyalkyleneoxide coupled zwitterionic moieties demonstrating ice-phobic properties when incorporated in to Silicone (>65% Polysiloxane) or Solgel (>10% solgel) or polyurethane (<40% Polysiloxane) or epoxy (<40% Polysiloxane) binder systems.

Despite advances in research directed to robust, effective, and economically viable ice-phobic surface materials, there is still a scarcity of materials that suitably provide solutions to all these requirements. These needs and other needs are satisfied by the present disclosure.

SUMMARY

In accordance with the purpose(s) of the disclosure, as embodied and broadly described herein, the disclosure, in one aspect, relates to sidechain functionalized organosiloxane compounds comprising polyalkyleneoxide (POA) and/or polyalkyleneoxide coupled zwitterionic moieties with various other modular side chains including reactive and or non-reactive groups. In various further aspects, the present disclosure further pertains to ice-phobic polymer formulations capable of curing on a substrate to form a surface that is ice-phobic, resistant to ice formation, and/or resistant to ice adhesion. The disclosed ice-phobic polymer formulations comprise one or more disclosed sidechain functionalized organosiloxane compound, one or more binder resin, and/or one or more lubricating liquid. The present disclosure further relates to articles comprising the disclosed sidechain functionalized organosiloxane compounds and/or ice-phobic polymer compositions, thereby providing articles having ice-phobic properties.

Disclosed are sidechain functionalized organosiloxane compounds comprising: (i) a first end and a second end; (ii) a polysiloxane backbone connecting the first end to the second end; and (iii) a first plurality of sidechains covalently attached to the polysiloxane backbone and a second plurality of sidechains covalently attached to the polysiloxane backbone; wherein the sidechains in the first plurality of sidechains have a chemical structure different from a chemical structure of the second plurality of sidechains; wherein the first plurality of sidechains comprise polyalkylene glycol sidechains; wherein the first plurality of sidechains and the second plurality of sidechains comprise a tethered end covalently attached to the polysiloxane backbone and a free end opposite to the tethered end; and wherein the free end in one or both of the first plurality of sidechains and the second plurality of sidechains comprises a reactive end group.

Also disclosed are sidechain functionalized organosiloxane compounds having a structure according to the following formula:

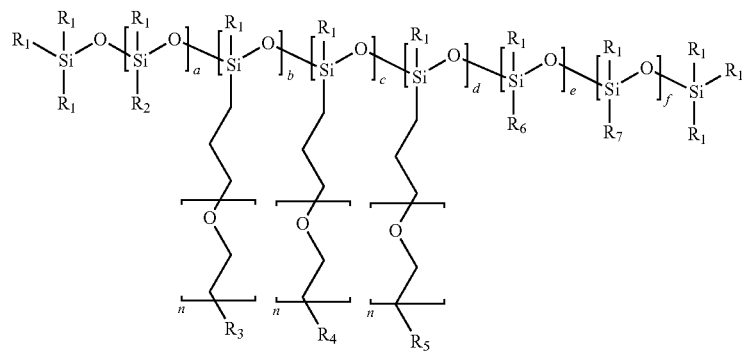

where $R_1$ is a methyl, alkyl, aryl, or fluoroalkyl; $R_2$ is an alkyl, allylic trimethyl silane, polydimethyl siloxane, fluoroalkyl, polydiphenyl siloxane, or perfluoro polyether; $R_3$ is a reactive or non-reactive group such as OH, amine, NCO, epoxy, amide, carbamate, alkyl ester, or alkyl ether; $R_4$ is a zwitterionic group such as phosphorylcholine, sulfobetaine, or carboxybetaine; $R_5$ is a polypropylene glycol or polybutylene glycol; $R_6$ is a trimethylsilane, methyl, alkyl, aryl, or fluoroalkyl; $R_7$ is a reactive group such as alkyl silane, hydroxyl, amine, amide, epoxy, NCO, or carbamate; n is an integer from about 6 to about 25; a is 0-30; b is 0-20; c is 0-20; d is 0-20; e is and f is 0-10.

Also disclosed are ice-phobic polymer formulations capable of curing on a substrate to form a surface that is ice-phobic, resistant to ice formation, and/or resistant to ice adhesion, the ice-phobic polymer formulation comprising: (a) a base resin composition comprising (i) one or more different polymeric precursors capable of curing to form a cured resin and (ii) a compound according to any one of claims 1-13 that comprises reactive end groups capable of reacting with the one or more different polymeric precursors; wherein, when the base resin composition is cured to form the cured resin, the reactive end groups in the compound react with the one or more different polymeric precursors so that the compound is integrated into the cured resin.

Also disclosed are ice-phobic polymer formulations capable of curing on a substrate to form a surface that is ice-phobic, resistant to ice formation, and/or resistant to ice adhesion, the ice-phobic polymer formulation comprising: (a) a base resin composition comprising (i) about 40 percent to about 90 percent by weight of one or more different polymeric precursors capable of curing to form a cured resin and (ii) about 2.5 percent to about 25 percent by weight of a compound according to any one of claims 1-13 that comprises reactive end groups capable of reacting with the one or more different polymeric precursors; wherein, when the base resin composition is cured to form the cured resin, the reactive end groups in the compound react with the one or more different polymeric precursors so that the compound is integrated into the cured resin.

Also disclosed are ice-phobic polymer formulations capable of curing on a substrate to form a surface that is ice-phobic, resistant to ice formation, and/or resistant to ice adhesion, the ice-phobic polymer formulation comprising: (a) a base resin composition comprising (i) about 40 percent to about 90 percent by weight of one or more silicone precursors capable of curing to form a cured resin and (ii) about 2.5 percent to about 25 percent by weight of a compound according to any one of claims 1-13 that comprises reactive end groups capable of reacting with the one or more different silicone precursors; wherein, when the base resin composition is cured to form the cured resin, the reactive end groups in the compound react with the one or more different silicone precursors so that the compound is integrated into the cured resin.

Also disclosed are coatings comprising a base resin composition and about 2.5 percent to about 25 percent by weight of a disclosed sidechain functionalized organosiloxane compound covalently bonded to the base resin composition.

Also disclosed are coating compositions comprising a silica solgel and about 1 percent to about 25 percent by weight, or about 2.5 percent to about 25 percent by weight, of a disclosed sidechain functionalized organosiloxane compound covalently bonded to the silica solgel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described aspects are usable in all aspects of the disclosure taught herein. Furthermore, the individual features of the dependent claims, as well as all optional and preferred features and modifications of the described aspects are combinable and interchangeable with one another.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1C show schematic representations of the water organization in typical surface grafting techniques. FIG. 1A shows polyzwitterionic brushes on a substrate surface. FIG. 1B shows water organization on a coating containing polyoxyalkylene coupled zwitterionic (POA-ZW) sidechain functionalized SAP. Without wishing to be bound by a particular theory, it is believed that upon exposure to water, POA chains extend to expose the zwitterionic groups creating stronger hydration effects compared to surface grafting. FIG. 1C shows a key for the various schematic structures shown in FIGS. 1A-1B.

FIG. 4A is a photographic image at the onset of frosting. FIG. 4B is a photographic image show completion of frosting of surface. These are representative pictures at the time and temperature recorded for onset frosting and completion of frosting.

FIG. 5A shows data for the average time for the onset of frosting and completion of frosting with test surfaces as shown in the figure. The data show that representative disclosed materials outperformed aluminum 6061 control, i.e., it takes longer for frosting on surfaces coated with representative disclosed ice-phobic polymer formulations to complete compared to the aluminum 6061 control. FIG. 5B shows for the rate of surface ice formation. The data show that surfaces coated with representative disclosed ice-phobic polymer formulations outperformed aluminum 6061 control, i.e., rate of surface ice formation on surfaces comprising representative disclosed compositions is slower compared on aluminum 6061 control.

FIGS. 7A-7H show representative photographic images of liquid water droplets on test surfaces. FIG. 7A shows photographic image obtained of a test surface (comprising a representative disclosed composition, AST coating prototype 600037) at time point α and shows that liquid water droplets are on the surface. In contrast, FIG. 7C a photographic image obtained of a test surface (control surface, aluminum 6061) at time point α and shows that which shows that all water on the aluminum 6061 surface has frosted over. FIG. 7B shows a photographic image obtained of a test surface (comprising a representative disclosed ice-phobic polymer formulation #600037) at time point β and shows that after 25 minutes of ice accumulation the underlying surface is still. In contrast, FIG. 7D shows a photographic image obtained of a test surface (control surface, aluminum 6061) at time point β and shows that the ice coverage on the surface is more uniform. FIGS. 7E-7H show the cross sections of the surfaces and are used to measure the frost thickness for each of FIGS. 7A-7D, respectively. The scalar bar is shown in the lower left of each image.

FIG. 8A shows data for average time of water shedding from a test surface as labelled in the figure. The data show that once the frost has melted the test surfaces comprising representative disclosed compositions shed water from the surface faster as compared to the control surface having aluminum 6061. FIG. 8B shows the rate of water shedding from a test surface as labelled in the figure. The data show that compared to the aluminum 6061, test surfaces comprising representative disclosed compositions shed water at a faster rate.

FIGS. 10A-10E show representative data pertaining to plate temperature profile and relative humidity profile in the frost mitigation test. FIG. 10A shows the plate temperature profile and the relative humidity profile. The environmental chamber is purged with nitrogen and the plate is cooled to −20° C. Once the plate equilibrates at −20° C. humidity introduced into the chamber and allowed to equilibrate at 70% RH. The surface is kept at −20° C. for 30 minutes after the humidity is introduced into the oven. FIG. 10B is a representative photographic image condensation frosting on a surface coated with a disclosed ice-phobic polymer composition, #600037, showing the presence of condensation frosting on the surface where the water condenses on the surface first and then transitions to frost. FIG. 10C shows an enlargement from the indicated area in FIG. 10B. FIG. 10D is a representative photographic image showing the deposition frosting on a control surface, aluminum 6061, and that sublimed water droplets directly frost onto the surface. FIG. 10E shows an enlargement from the indicated area in FIG. 10D.

FIG. 11A shows the freezing point depression with formulations comprising AM-26 with different additive concentrations (see Examples for disclosure of the specification formulations designated in the figure). FIG. 11B shows the freezing point depression with formulations comprising AM-48 with different additive concentrations (see Examples for disclosure of the specification formulations designated in the figure). FIG. 11C shows the freezing point depression with formulations comprising AM-59 with different additive concentrations (see Examples for disclosure of the specification formulations designated in the figure).

FIG. 15A shows the ice shedding measurement centrifuge stand used to perform the dynamic frosting test. There were test beams which house the testing coupons attached to a rotating motor. The instrument is kept in an environmental chamber. FIG. shows the aluminum test coupons (1" diameter) that were used for the dynamic frosting test.

FIGS. 17A-17B show representative data obtained using the roughness test described herein below. FIG. 17A shows data relating surface roughness in terms of Ra versus time for a surface to frost on a surface coated with the representative disclosed composition (#600037) compared to a control surface (aluminum 6061). FIG. 17B shows data relating surface roughness in terms of Rz versus time for a surface to frost on a surface coated with the representative disclosed composition (#600037) compared to a control surface (aluminum 6061). The data show the surface coated with the representative disclosed composition (#600037) has slower onset of frost formation compared to the control surface.

FIG. 18A shows data relating temperature with frost onset time for a surface to frost on a surface coated with the representative disclosed composition (#600037) compared to a control surface (aluminum 6061). The data show that although the time for frosting to occur decreases for a surface coated with the representative disclosed composition (#600037) as the temperature decrease, it remains associated with condensation frosting, whereas the control surface shows deposition frosting. FIG. 18B shows data relating temperature with average droplet size on a surface coated with the representative disclosed composition (#600037) compared to a control surface (aluminum 6061). The data show that the water droplets on the surface are still measurable a surface coated with the representative disclosed composition (#600037), whereas the control surface is covered in a layer of frost within 30 seconds.

FIG. 19A shows a representative depth profile of an area of a sample that is tested. FIG. 19B shows the line profile data extracted from the FIG. 19B. The roughness parameters $R_a$ (average roughness) and Rz (difference between the highest peak and lowest valley) are calculated based on the parameters shown in the figure.

Figure 2:
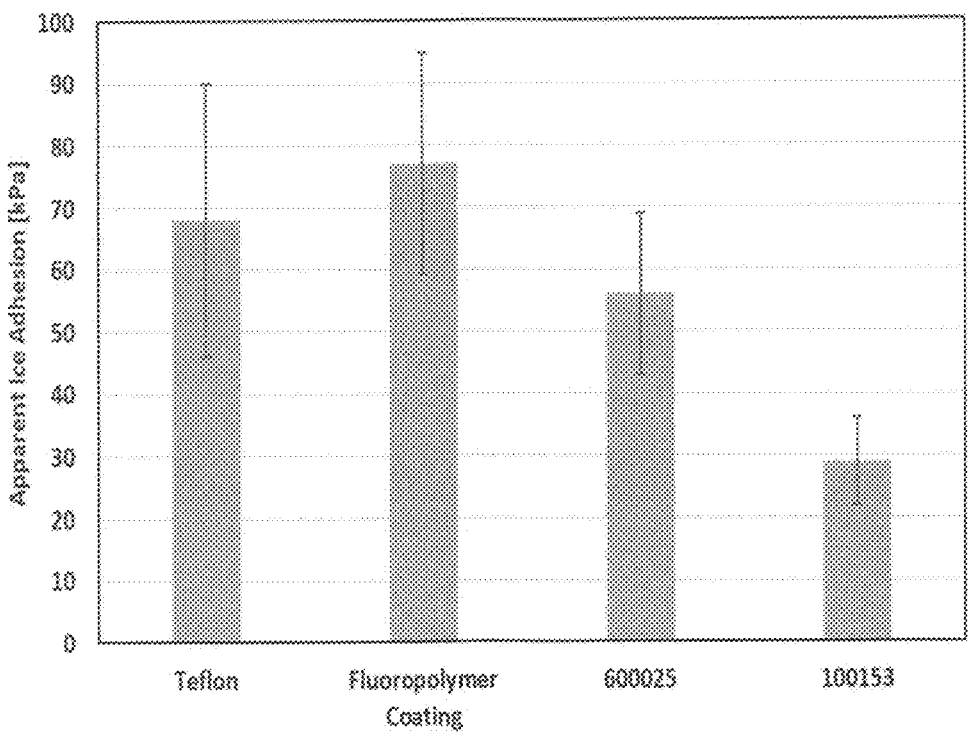
FIG. 2 shows representative data of the average apparent ice adhesion strength (kPa) for representative disclosed test surfaces.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Before the present disclosure is described in greater detail, it is to be understood that this disclosure is not limited to particular aspects described, and as such may, of course, vary. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some aspects, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Throughout the application, where language such as having, including, or comprising is used to describe specific components or process steps, it is contemplated that other aspects exist that consist essentially of, or consist of the specific components or process steps.

The term "substantially free" as used in this context means the reaction product and/or coating compositions contain less than 1000 parts per million (ppm), "essentially free" means less than 100 ppm and "completely free" means less than 20 parts per billion (ppb) of any of the above compounds or derivatives or residues thereof. The term "about," as used herein, means approximately, in the region of, roughly, or around. When the term "about" is used with a numerical value, it modifies that value by extending the boundaries above and below the numerical value set forth. For example, in some aspects, the term "about" is used herein to modify a numerical value above and below the stated value by a variance of ±20%, ±15%, or ±10% of the stated value. In some aspects, the term "about" can reflect traditional uncertainties in experimental measurements and/or traditional rounding according to significant figures of the numerical value.

As used herein, "ice phobic" or "ice-phobic", which can be used interchangeably, refer to a composition, material, formulation, or coating that reduces the freeze point depression of water, delay ice nucleation, repels water and/or significantly reduces the apparent ice adhesion on the surface.

The term "alkyl" refers to the radical of saturated aliphatic groups, including straight-chain alkyl groups, branched-chain alkyl groups, cycloalkyl (alicyclic) groups, alkyl-substituted cycloalkyl groups, and cycloalkyl-substituted alkyl groups.

In some aspects, a straight chain or branched chain alkyl has 30 or fewer carbon atoms in its backbone (e.g., $C_1$-$C_{30}$ for straight chains, $C_3$-$C_{30}$ for branched chains), 20 or fewer, 12 or fewer, or 7 or fewer. Likewise, in some aspects cycloalkyls have from 3-10 carbon atoms in their ring structure, e.g. have 5, 6 or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a hosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, or from one to six carbon atoms in its backbone structure. Likewise, "lower alkenyl" and "lower alkynyl" have similar chain lengths. Throughout the application, preferred alkyl groups are lower alkyls. In some aspects, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In some aspects, the "alkylthio" moiety is represented by one of —S-alkyl, —S-alkenyl, and —S-alkynyl. Representative alkylthio groups include methylthio, and ethylthio. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, and tert-butoxy. An "ether" is two hydrocarbons covalently linked by an oxygen.

Accordingly, the substituent of an alkyl that renders that alkyl an ether is or resembles an alkoxyl, such as can be represented by one of —O-alkyl, —O-alkenyl, and —O-alkynyl. Aroxy can be represented by —O-aryl or O-heteroaryl, wherein aryl and heteroaryl are as defined below. The alkoxy and aroxy groups can be substituted as described above for alkyl.

The terms "amine" and "amino" are art-recognized and refer to both unsubstituted and substituted amines, e.g., a moiety that can be represented by the general formula:

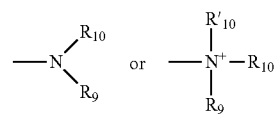

wherein $R_9$, $R_{10}$, and $R'_{10}$ each independently represent a hydrogen, an alkyl, an alkenyl, —$(CH_2)_m$—$R_8$ or $R_9$ and $R_{10}$ taken together with the N atom to which they are attached complete a heterocycle having from 4 to 8 atoms in the ring structure; $R_8$ represents an aryl, a cycloalkyl, a cycloalkenyl, a heterocycle or a polycycle; and m is zero or an integer in the range of 1 to 8. In some aspects, only one of $R_9$ or $R_{10}$ can be a carbonyl, e.g., $R_9$, $R_{10}$ and the nitrogen together do not form an imide. In still other aspects, the term "amine" does not encompass amides, e.g., wherein one of $R_9$ and $R_{10}$ represents a carbonyl. In additional aspects, $R_9$ and $R_{10}$ (and optionally $R'_{10}$) each independently represent a hydrogen, an alkyl or cycloakly, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of $R_9$ and $R_{10}$ is an alkyl group.

The term "amido" is art-recognized as an amino-substituted carbonyl and includes a moiety that can be represented by the general formula:

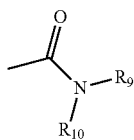

wherein $R_9$ and $R_{10}$ are as defined above.

"Aryl", as used herein, refers to $C_5$-$C_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN; and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. One or more of the rings can be substituted as defined above for "aryl".

The term "aralkyl", as used herein, refers to an alkyl group substituted with an aryl group (e.g., an aromatic or heteroaromatic group).

The term "carbocycle", as used herein, refers to an aromatic or non-aromatic ring in which each atom of the ring is carbon.

"Heterocycle" or "heterocyclic", as used herein, refers to a cyclic radical attached via a ring carbon or nitrogen of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, ($C_1$-$C_{10}$) alkyl, phenyl or benzyl, and optionally containing 1-3 double bonds and optionally substituted with one or more substituents. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, and —CN.

The term "carbonyl" is art-recognized and includes such moieties as can be represented by the general formula:

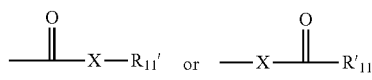

wherein X is a bond or represents an oxygen or a sulfur, and $R_{11}$ represents a hydrogen, an alkyl, a cycloalkyl, an alkenyl, an cycloalkenyl, or an alkynyl, $R'_{11}$ represents a hydrogen, an alkyl, a cycloalkyl, an alkenyl, an cycloalkenyl, or an alkynyl. Where X is an oxygen and $R_{11}$ or $R'_{11}$ is not hydrogen, the formula represents an "ester". Where X is an oxygen and $R_{11}$ is as defined above, the moiety is referred to herein as a carboxyl group, and particularly when $R_{11}$ is a hydrogen, the formula represents a "carboxylic acid". Where X is an oxygen and $R'_{11}$ is hydrogen, the formula represents a "formate". In general, where the oxygen atom of the above formula is replaced by sulfur, the formula represents a "thiocarbonyl" group. Where X is a sulfur and $R_{11}$ or $R'_{11}$ is not hydrogen, the formula represents a "thioester." Where X is a sulfur and Rn is hydrogen, the formula represents a "thiocarboxylic acid." Where X is a sulfur and $R'_{11}$ is hydrogen, the formula represents a "thioformate." On the other hand, where X is a bond, and $R_{11}$ is not hydrogen, the above formula represents a "ketone" group. Where X is a bond, and $R_{11}$ is hydrogen, the above formula represents an "aldehyde" group.

The term "monoester" as used herein refers to an analogue of a dicarboxylic acid wherein one of the carboxylic acids is functionalized as an ester and the other carboxylic acid is a free carboxylic acid or salt of a carboxylic acid. Examples of monoesters include, but are not limited to, to monoesters of succinic acid, glutaric acid, adipic acid, suberic acid, sebacic acid, azelaic acid, oxalic and maleic acid.

The term "heteroatom" as used herein means an atom of any element other than carbon or hydrogen. Examples of heteroatoms are boron, nitrogen, oxygen, phosphorus, sulfur and selenium. Other heteroatoms include silicon and arsenic.

As used herein, the term "nitro" means $—NO_2$; the term "halogen" designates —F, —Cl, —Br or —I; the term "sulfhydryl" means —SH; the term "hydroxyl" means —OH; and the term "sulfonyl" means $—SO_2—$.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, aminoacid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. The heteroatoms such as nitrogen may have hydrogen substituents and/or any permissible substituents of organic compounds described herein which satisfy the valencies of the heteroatoms.

In various aspects, the substituent is selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone, each of which optionally is substituted with one or more suitable substituents. In some aspects, the substituent is selected from alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone, wherein each of the alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone can be further substituted with one or more suitable substituents.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, thioketone, ester, heterocyclyl, —CN, aryl, aryloxy, perhaloalkoxy, aralkoxy, heteroaryl, heteroaryloxy, heteroarylalkyl, heteroaralkoxy, azido, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like. In some aspects, the substituent is selected from cyano, halogen, hydroxyl, and nitro.

As used herein, an "analog", or "analogue" of a chemical compound is a compound that, by way of example, resembles another in structure but is not necessarily an isomer (e.g., 5-fluorouracil is an analog of thymine).

As used herein, a "derivative" of a compound refers to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include replacement of H by an alkyl, acyl, or amino group or a substituent described above. Derivatives can include compounds in which carboxyl groups in the parent compound have been derivatized to form salts, methyl and ethyl esters or other types of esters or hydrazides. Derivatives can include compounds in which hydroxyl groups in the parent compound have been derivatized to form O-acyl or O-alkyl derivatives. Derivatives can include compounds in which a hydrogen bond donating group in the parent compound is replaced with another hydrogen bond donating group such as OH, NH, or SH. Derivatives can include replacing a hydrogen bond acceptor group in the parent compound with another hydrogen bond acceptor group such as esters, ethers, ketones, carbonates, tertiary amines, imine, thiones, sulfones, tertiary amides, and sulfides.

Unless otherwise indicated, the term "polymer" includes both homopolymers and copolymers (e.g., polymers of two or more different monomers) and oligomers. Similarly, unless otherwise indicated, the use of a term designating a polymer class is intended to include homopolymers, copolymers and graft copolymers.

The term "molecular weight", as used herein, generally refers to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

The term "small molecule", as used herein, generally refers to an organic molecule that is less than 2000 g/mol in molecular weight, less than 1500 g/mol, less than 1000 g/mol, less than 800 g/mol, or less than 500 g/mol. Small molecules are non-polymeric and/or non-oligomeric.

The term "hydrophilic", as used herein, refers to substances that have strongly polar groups that readily interact with water. Hydrophilic polymers can include acrylic acid homo- and co-polymers such as acrylamide, and maleic anhydride polymers and copolymers; amine-functional polymers such as allylamine, ethyleneimine, oxazoline, and other polymers containing amine groups in their main- or side-chains. The term hydrophilic, when used to refer to a polymer or oligomer, can mean a polymer or oligomer having a relative energy difference (RED=$R_a/R_0$, where $R_a$=Polymer/Solvent HSP Distance, $R_0$=Polymer Solubility Sphere Radius) of equal or less than 1 with respect to water in Hansen solubility space at 25° C.

The term "hydrophobic", as used herein, refers to substances that lack an affinity for water; tending to repel and not absorb water as well as to not readily dissolve in or mix with water. The term hydrophobic, when used to refer to a polymer or oligomer, can mean a polymer or oligomer having a relative energy difference (RED=$R_a/R_0$, where $R_a$=Polymer/Solvent HSP Distance, $R_0$=Polymer Solubility Sphere Radius) greater than 1 with respect to water in Hansen solubility space at 25° C.

The term "amphiphilic", as used herein, refers to a molecule combining hydrophilic and lipophilic (hydrophobic) properties. "Amphiphilic material" as used herein refers to a material containing a hydrophobic or more hydrophobic oligomer or polymer (e.g., biodegradable oligomer or polymer) and a hydrophilic or more hydrophilic oligomer or polymer. The term amphiphilic can refer to a polymer or oligomer having one or more hydrophobic oligomer segments and one or more hydrophilic oligomer segments as those terms are defined above.

The terms "Surface Active Polymer" and "SAP", which can be used interchangeably, as used herein refer to an amphiphilic polymeric molecule having similar properties to a small molecule surfactant. SAPs have both hydrophobic part and hydrophilic part in one polymeric molecule. One example of SAPs is a polymeric architecture with a hydrophobic backbone (e.g. polysiloxane) with one or more hydrophilic sidechains (e.g. PEG) grafted from the backbone. Another example of SAPs is a block-co-polymer architecture comprising a hydrophobic segment and a hydrophilic segment. SAPs introduced into a binder or film forming system tend to spontaneously segregate from the binder to form a stratified film or coating and present themselves at the surface. The process is driven by phase separation due to mismatched compatibility or poor solubility in the binder, minimization of interfacial energy during solidification, buoyancy due to density difference, and combinations thereof. SAPs can thus be designed and used to impart new physical or chemical properties at the surface of a film or coating that the binder alone cannot provide.

SAP: Sidechain Functionalized Organosiloxane Compounds.

The present disclosure describes a variety of modular, customizable organosiloxanes compound with such moieties; surface-active groups, polyalkyleneoxide (POA), polyalkyleneoxide groups, polyalkyleneoxide coupled zwitterionic (POA-ZW), and reactive functional groups included as side chains on a polysiloxane backbone. Further, when the described compounds are incorporated in coating systems, such surface-active polymers show strong propensity to stratify during curing. Therefore, the resultant coatings are able to present active groups on the surface leading to effective ice-phobic properties. In some aspects, combining one or more lubricating oil with one or more SAPs may further enhance the ice-phobic properties.

In various aspects, a disclosed SAP comprises a disclosed sidechain functionalized organosiloxane compounds can comprise: (i) a first end and a second end; (ii) a polysiloxane backbone connecting the first end to the second end; and (iii) a first plurality of sidechains covalently attached to the polysiloxane backbone and a second plurality of sidechains covalently attached to the polysiloxane backbone; wherein the sidechains in the first plurality of sidechains have a chemical structure different from a chemical structure of the second plurality of sidechains; wherein the first plurality of sidechains comprise polyalkylene glycol sidechains; wherein the first plurality of sidechains and the second plurality of sidechains comprise a tethered end covalently attached to the polysiloxane backbone and a free end opposite to the tethered end; and wherein the free end in one or both of the first plurality of sidechains and the second plurality of sidechains comprises a reactive end group.

In a further aspect, a disclosed SAP comprises disclosed sidechain functionalized organosiloxane compounds having a structure according to the following formula:

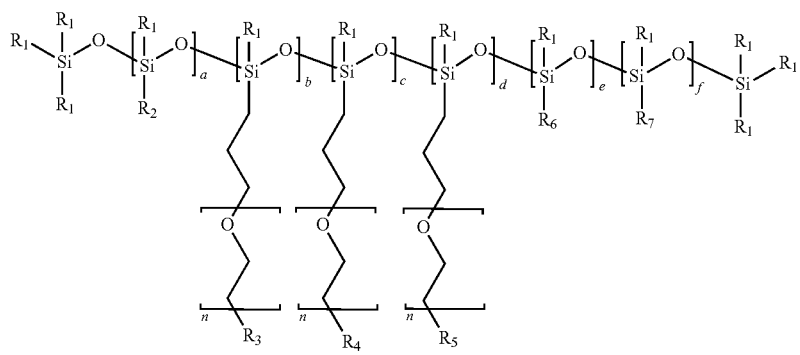

where $R_1$ is a alkyl, aryl, or fluoroalkyl; $R_2$ is an alkyl, trialkylsilane, polydimethyl siloxane, fluoroalkyl, polydiphenyl siloxane, or perfluoro polyether; $R_3$ is a reactive or non-reactive group such as OH, amine, NCO, epoxy, amide, carbamate, alkyl ester, or alkyl ether; $R_4$ is a zwitterionic group; $R_5$ is a polypropylene glycol or polybutylene glycol; $R_6$ is a trialkylsilane, alkyl, aryl, or fluoroalkyl; $R_7$ is a reactive group such as alkyl silane, alkoxy silane, hydroxyl, amine, amide, epoxy, NCO, or carbamate; n is an integer from about 6 to about 25; a is 0-30; b is 0-20; c is 0-20; d is 0-20; e is 0-50; and f is 0-10.

In a further aspect, a disclosed SAP comprises disclosed sidechain functionalized organosiloxane compounds having a structure according to the following formula:

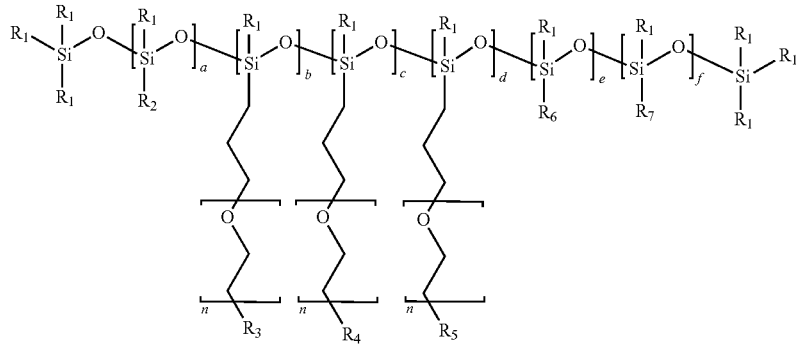

where $R_1$ is a alkyl, aryl, or fluoroalkyl; $R_2$ is an alkyl, trialkylsilane, polydimethyl siloxane, fluoroalkyl, polydiphenyl siloxane, or perfluoro polyether; $R_3$ is a reactive or non-reactive group such as OH, amine, NCO, epoxy, amide, carbamate, alkyl ester, or alkyl ether; $R_4$ is a zwitterionic group such as phosphorylcholine, sulfobetaine, or carboxybetaine; $R_5$ is a polypropylene glycol or polybutylene glycol; $R_6$ is a trialkylsilane, alkyl, aryl, or fluoroalkyl; $R_7$ is a reactive group such as alkyl silane, alkoxy silane, hydroxyl, amine, amide, epoxy, NCO, or carbamate; n is an integer from about 6 to about 25; a is 0-30; b is 0-20; c is 0-20; d is 0-20; e is 0-50; and f is 0-10.

In a further aspect, a disclosed SAP comprises disclosed sidechain functionalized organosiloxane compounds having a structure according to the following formula:

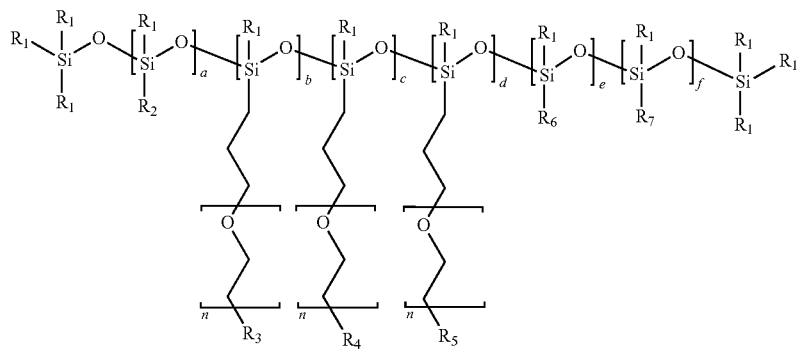

where $R_1$ is a methyl, alkyl, aryl, or fluoroalkyl; $R_2$ is an alkyl, allylic trimethyl silane, polydimethyl siloxane, fluoroalkyl, polydiphenyl siloxane, or perfluoro polyether; $R_3$ is a reactive or non-reactive group such as OH, amine, NCO, epoxy, amide, carbamate, alkyl ester, or alkyl ether; $R_4$ is a zwitterionic group such as phosphorylcholine, sulfobetaine, or carboxybetaine; $R_5$ is a polypropylene glycol or polybutylene glycol; $R_6$ is a trimethylsilane, methyl, alkyl, aryl, or fluoroalkyl; $R_7$ is a reactive group such as alkyl silane, hydroxyl, amine, amide, epoxy, NCO, or carbamate; n is an integer from about 6 to about 25; a is 0-30; b is 0-20; c is 0-20; d is 0-20; e is and f is 0-10.

In a further aspect, a disclosed SAP comprises disclosed sidechain functionalized organosiloxane compounds having a structure according to the following formula:

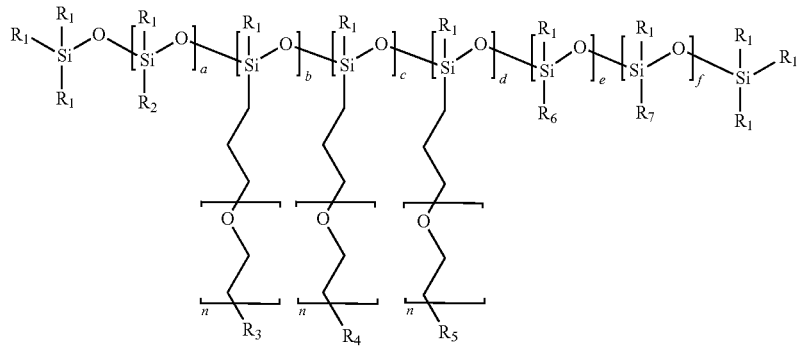

where $R_1$ is a methyl, alkyl, aryl, or fluoroalkyl; $R_2$ is an alkyl, allylic trimethyl silane, polydimethyl siloxane, fluoroalkyl, polydiphenyl siloxane, or perfluoro polyether; $R_3$ is a reactive or non-reactive group such as OH, amine, NCO, epoxy, amide, carbamate, alkyl ester, or alkyl ether; $R_4$ is a zwitterionic group such as phosphorylcholine, sulfobetaine, or carboxybetaine; $R_5$ is a polypropylene glycol or polybutylene glycol; $R_6$ is a methyl, alkyl, aryl, or fluoroalkyl; $R_7$ is a reactive group such as alkyl silane, hydroxyl, amine, amide, epoxy, NCO, or carbamate; n is an integer from about 6 to about 25; a is 0-30; b is 0-20; c is 0-20; d is 0-20; e is 0-50; and f is 0-10.

In a further aspect, $R_1$ is a $C_1$-$C_{12}$ alkyl, aryl, or C1-C12 fluoroalkyl. In a still further aspect, $R_1$ is a C6-C12 alkyl, aryl, or C1-C6 fluoroalkyl. In a yet further aspect, $R_1$ is a C6-C12 alkyl, aryl, or C6-C12 fluoroalkyl. In an even further aspect, $R_1$ is a C1-C6 alkyl, aryl, or C1-C6 fluoroalkyl. In a still further aspect, $R_1$ is a C1-C3 alkyl, aryl, or C1-C3 fluoroalkyl. In a yet further aspect, $R_1$ is methyl, ethyl, aryl, or C—C6 fluoroalkyl. In an even further aspect, $R_1$ is methyl, aryl, or C1-C6 fluoroalkyl. In a yet further aspect, FR, is methyl, ethyl, aryl, or C—C3 fluoroalkyl. In an even further aspect, $R_1$ is methyl, aryl, or C1-C3 fluoroalkyl.

In a further aspect, R, is a C1-C12 alkyl. In a still further aspect, $R_1$ is a C1-C6 alkyl. In a yet further aspect, $R_1$ is a C6-C12 alkyl. In an even further aspect, $R_1$ is a C1-C3 alkyl. In a yet further aspect, $R_1$ is methyl or ethyl. In an still further aspect, R, is methyl.

As used herein, "alkyl silane" includes "trialkyl silanes" as described herein below.

As used herein, "alkoxy silane" includes "trialkoxy silanes" as described herein below.

As used herein, "fluoroalkyl" comprises any of a C1-C12 fluoroalkyl, C6-C12 fluoroalkyl, C1-C6 fluoroalkyl, and C1-C3 fluoroalkyl. It is to be understood that the fluoroalkyl comprises monofluoro, difluoro, and trifluoro substitutions.

In a further aspect, $R_2$ is an C1-C12 alkyl, tri(C1-C6 alkyl)silane, C1-C12 allylic trimethyl silane, polydimethyl siloxane, fluoroalkyl, polydiphenyl siloxane, or perfluoro polyether. In a still further aspect, $R_2$ is an C1-C6 alkyl, tri(C1-C3 alkyl)silane, C1-C6 allylic trimethyl silane, polydimethyl siloxane, fluoroalkyl, polydiphenyl siloxane, or perfluoro polyether.

In a further aspect, $R_3$ is a reactive or non-reactive group comprising an OH, amine, NCO, epoxy, amide, carbamate, C1-C12 alkyl ester, or C1-C12 alkyl ether. In a further aspect, $R_3$ is a reactive or non-reactive group such as OH, amine, NCO, epoxy, amide, carbamate, C1-C6 alkyl ester, or C1-C6 alkyl ether.

In a further aspect, $R_3$ is a reactive group comprising an OH, amine, NCO, epoxy, amide, carbamate, C1-C12 alkyl ester, or C1-C12 alkyl ether. In a further aspect, $R_3$ is a reactive group such as OH, amine, NCO, epoxy, amide, carbamate, C1-C6 alkyl ester, or C1-C6 alkyl ether.

In a further aspect, $R_4$ is phosphorylcholine, sulfobetaine, or carboxybetaine. In still further aspect, $R_4$ is phosphorylcholine. In a yet further aspect, $R_4$ is sulfobetaine. In an even further aspect, $R_4$ is carboxybetaine.

In a further aspect, $R_6$ is a trialkylsilane group, C1-C12 alkyl, C5-C12 aryl, or C1-C12 fluoroalkyl. In a further aspect, $R_6$ is a trimethylsilane group, C1-C6 alkyl, C5-C6 aryl, or C1-C6 fluoroalkyl. It is understood that the term "trialkylsilane group" comprises alkanediyl trialkyl silane moieties having the structure:

—(C1-C12)-Si(C1-C6)$_3$.

The present disclosure contemplates any trimethylsilane group within the foregoing genus, e.g., —(C1-C6)-Si(C1-C3)$_3$, —(C1-C3)-Si(CH$_3$)$_3$, and the like. In some instances, the trialkylsilane group is a trimethyl silane group such as, for example, having a structure:

—(C1-C12)-Si(CH$_3$)$_3$ or —(CH$_2$)$_3$—Si(CH$_3$)$_3$.

It is understood that the term "trialkoxysilane group" comprises alkanediyl trialkyl silane moieties have the structure:

—(C1-C12)-Si(OC1-C6)$_3$.

The present disclosure contemplates any trimethylsilane group within the foregoing genus, e.g., —(C1-C3)-Si(CH$_3$)$_3$, —(C1-C3)-Si(CH$_3$)$_3$, and the like. In some instances, the trialkoxysilane group is a trimethoxysilane group such as, for example, having a structure:

—(C1-C12)-Si(OCH$_3$)$_3$ or —(CH$_2$)$_3$—Si(OCH$_3$)$_3$.

Further, not wishing to be bound by any particular theory, it is believed that having the zwitterionic groups presented at the end of polyalkylene oxide chains allow for effective exposure of the zwitterionic groups at the coating/water interface as the polyoxyalkylene side chains of the said SAP can further extend (to its radius of gyration) into the water phase (see FIGS. 1A-1C) enhancing the ice-phobic properties.

Such surface-active polymers can contain additional polyoxyalkylene and or zwitterionic sidechains, additional polysiloxane sidechains, and a sidechain comprising a reactive groups for covalent attachment to coating binder systems. Not wishing to be bound by any particular theory, it is believed that the SAP can migrate close to the surface during curing of the coating and upon exposure to water, the POA and or POA-ZW moieties dynamically align toward the water at the interface of water and coating. This promotes adequate hydration of the coating surface when exposed to water, and as a consequence, the coating can demonstrate ice-phobic properties. Additionally, the hydrogen bonding capability of POA and or POA-ZW sidechains may also provide coatings and surfaces with delay freezing or freezing point depression.

Such SAPs can be formulated into coating topcoats, tiecoats or primers. Such SAPs can be incorporated in coatings with siloxane, epoxy, urethane, Solgel or other binder systems.

In some aspects, the compound contain a directly coupled polyoxyalkylene-zwitterionic moiety containing a polysiloxane segment for surface partitioning for use in ice-phobic coatings.

In some aspects, the compounds contain polyoxyalkylene-zwitterionic moiety and optionally containing additional zwitterionic and polyoxyalkylene segments, with one or more reactive groups substantially reactive with the coating system.

In some aspects, the compounds are included in ice-phobic coatings and materials.

In some aspects, the compounds are included in icephobic coatings comprising other polyoxyalkylene-zwitterionic moiety-containing SAPs In some aspects, the compounds are included in ice-phobic coatings comprising polyoxyalkylene-zwitterionic moiety containing oils.

In some aspects, the compounds are included in ice-phobic coatings comprising low surface energy co-additive such as polysiloxane or polyfluoroalkyl compounds.

Reactive surface-active polymers of the present disclosure can be represented by the following structure:

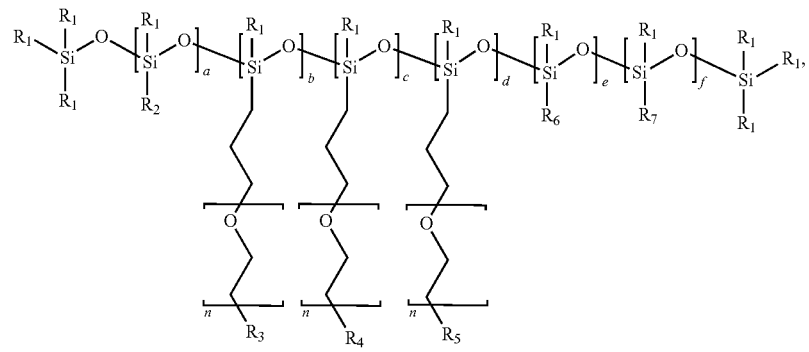

wherein $R_1$ can be a methyl, alkyl, aryl, fluoroalkyl; $R_2$ can be alkyl, allylic trimethyl silane, polydimethyl siloxane, fluoroalkyl, polydiphenyl siloxane, or periluoro polyether; $R_3$ can be a reactive or non-reactive groups such as OH, amine, NCO, epoxy, amide, carbamate, alkyl ester, or alkyl ether; $R_4$ can be a zwitterionic group such as phosphorylcholine, sulfobetaine, or carboxybetaine; $R_5$ can be a polypropylene glycol or polybutylene glycol; $R_6$ can be a methyl, alkyl, aryl, or fluoroalkyl; $R_7$ can be a reactive group such as alkyl silane, hydroxyl, amine, amide, epoxy, NCO, or carbamate. In FIG. 1, n can be an integer from about 6 to about 25, e.g. about 6 to 15 or about 10; a can be 0-30; b can be 0-20; c can be 0-20; d can be 0-20; e can be 0-50; f can be 0-10.

In some aspects, disclosed reactive surface-active polymers include compounds according to structure above where a+b+c+d+e+f>1. In a further aspect, disclosed reactive surface-active polymers comprise compounds where c is at least 1, e is at least 1, and f is at least 1. A representative preferred combination includes compounds according to FIG. 1 where a is at least 1, c is at least 1, e is at least 1, and f is at least 1. In a still further aspect, disclosed reactive surface-active polymers comprise compounds where a is at least 1, c is at least 1, and e is at least 1. In a further aspect, disclosed reactive surface-active polymers comprise compounds where b is at least 1, c is at least 1, e is at least 1, and f is at least 1. In a yet further aspect, disclosed reactive surface-active polymers comprise compounds where a is at least 1, b is at least 1, c is at least 1, e is at least 1, and f is at least 1. In an even further aspect, disclosed reactive surface-active polymers comprise compounds where a is at least 1, b is at least 1 and f is at least 1. In a still further aspect, disclosed reactive surface-active polymers comprise compounds where a is at least 1, b is at least 1, d is at least 1 and f is at least 1. In a yet further aspect, disclosed reactive surface-active polymers comprise compounds where a is at least 1, d is at least 1 and e is at least 1. In an even further aspect, disclosed reactive surface-active polymers comprise compounds where f=0 and at least one or combination of a, b, c, d, and e are non-zero.

FIGS. 1A-1C show schematic representations of the water organization in typical surface grafting techniques. FIG. 1A shows polyzwitterionic brushes on a substrate surface. FIG. 1B shows water organization on a coating containing polyoxyalkylene coupled zwitterionic (POA-ZW) sidechain functionalized SAP. Without wishing to be bound by a particular theory, it is believed that upon exposure to water, POA chains extend to expose the zwitterionic groups creating stronger hydration effects compared to surface grafting. FIG. 1C shows a key for the various schematic structures shown in FIGS. 1A-1B. Without wishing to be bound by a particular theory, the disclosed sidechain functionalized organosiloxane compounds provide a propensity to migrate towards the surface and effectively present the sidechains when combined into an appropriate curable mixture with binder resin and/or lubricating liquids.

Ice-Phobic Polymer Formulations

In various aspects, the present disclosure pertains to ice-phobic polymer formulations capable of curing on a substrate to form a surface that is ice-phobic, resistant to ice formation, and/or resistant to ice adhesion, the ice-phobic polymer formulation comprising: (a) a base resin composition comprising (i) one or more different polymeric precursors capable of curing to form a cured resin and (ii) a compound according to any one of claims 1-13 that comprises reactive end groups capable of reacting with the one or more different polymeric precursors; wherein, when the base resin composition is cured to form the cured resin, the reactive end groups in the compound react with the one or more different polymeric precursors so that the compound is integrated into the cured resin.

In a further aspect, disclosed herein are ice-phobic polymer formulations capable of curing on a substrate to form a surface that is ice-phobic, resistant to ice formation, and/or resistant to ice adhesion, the ice-phobic polymer formulation comprising: (a) a base resin composition comprising (i) about 40 percent to about 90 percent by weight of one or more different polymeric precursors capable of curing to form a cured resin and (ii) about 2.5 percent to about 25 percent by weight of a compound according to any one of claims 1-13 that comprises reactive end groups capable of reacting with the one or more different polymeric precursors; wherein, when the base resin composition is cured to form the cured resin, the reactive end groups in the compound react with the one or more different polymeric precursors so that the compound is integrated into the cured resin.

In a further aspect, disclosed herein are ice-phobic polymer formulations capable of curing on a substrate to form a surface that is ice-phobic, resistant to ice formation, and/or resistant to ice adhesion, the ice-phobic polymer formulation comprising: (a) a base resin composition comprising (i) about 40 percent to about 90 percent by weight of one or more silicone precursors capable of curing to form a cured resin and (ii) about 2.5 percent to about 25 percent by weight of a compound according to any one of claims 1-13 that comprises reactive end groups capable of reacting with the one or more different silicone precursors; wherein, when the base resin composition is cured to form the cured resin, the reactive end groups in the compound react with the one or more different silicone precursors so that the compound is integrated into the cured resin.

Articles Comprising Ice-Phobic Polymer Formulations

The disclosed ice-phobic polymer formulations can be used to form a surface of an article or used to form a coating on a substrate or a surface of an article to provide ice-phobic properties to the article. In a further aspect, the disclosed articles can comprise a coating comprising a base resin composition and about 2.5 percent to about 25 percent by weight of a disclosed sidechain functionalized organosiloxane compound covalently bonded to the base resin composition. In a still further aspect, the disclosed articles can be coated using a coating composition comprising a silica solgel and about 2.5 percent to about 25 percent by weight of a disclosed sidechain functionalized organosiloxane compound covalently bonded to the silica solgel.

In various aspects, the article is such that it comprises a component having a surface that encounters or is exposed to the environment, including moisture in the air, and such that the performance or function of the article can be improved by providing the component with an ice-phobic surface comprising a coating comprising the disclosed ice-phobic polymer formulations. In some instances, the article is an aerodynamic article, including, but not limited to, the surface of aircraft components or wind turbine components. Examples of an article component that can be enhanced, i.e., provided an ice-phobic surface or characteristic, by the disclosed ice-phobic polymer formulations include, but are not limited to, aircraft engine components such as fan blades and air splitters as well as aircraft fuselages, aircraft wings, aircraft propeller blades, aircraft heat exchangers, wind turbine blades, marine structure, marine vessel, bridge, vehicles such as a car and truck, gas turbines, power lines, cloth, textiles, housewares, such as refrigerators and freezers, telecommunications equipment such as radio antennas or cell phone towers, solar panels, power equipment such as transformers, sporting equipment, rubber, plastic, road signs, traffic lights, sidewalks, vehicles, snow removal equipment, and off-shore oil and gas structures. Further non-limiting examples of articles having components that may comprise a coating comprising disclosed ice-phobic polymer formulations include skis, snowboards, sleighs, sleds, skates, and many other winter sports equipment. In a further aspect, the disclosed ice-phobic polymer formulations can be used to coat skis, snowboards, sleighs, sleds, skates, and many other winter sports equipment.

For the purposes of the present disclosure, the word "coating" refers to covering at least a portion of a surface of the article or substrate with the coating described in aspects herein, and may include instances where the article or substrate is impregnated or otherwise penetrated with the coating of embodiments herein. In some aspects, the ice-phobic coating may be coated, impregnated, applied, covered, spread, instilled, penetrated, saturated, suffused, spin coated, splayed, spraying (e.g., via an aerosolized formulation), brushing, rolling, dipping, or the like onto an article to form a coated article.

References

References are cited herein throughout using the format of reference number(s) enclosed by parentheses corresponding to one or more of the following numbered references. For example, citation of references numbers 1 and 2 immediately herein below would be indicated in the disclosure as (Refs. 1 and 2).

Ref 1: Jamil, M. I.; Ali, A.; Haq, F.; Zhang, Q.; Zhan, X.; Chen, F., Icephobic Strategies and Materials with Superwettability: Design Principles and Mechanism. Langmuir 2018, 34 (50), 15425-15444.

Ref 2: Richard, D.; Clanet, C.; Quéré D., Contact time of a bouncing drop. Nature 2002, 417 (6891), 811-811.

Ref 3: Wong, T.-S.; Kang, S. H.; Tang, S. K. Y.; Smythe, E. J.; Hatton, B. D.; Grinthal, A.; Aizenberg, J., Bioinspired self-repairing slippery surfaces with pressure-stable omniphobicity. Nature 2011, 477 (7365), 443-447.

Ref 4: Kim, P.; Wong, T.-S.; Alvarenga, J.; Kreder, M. J.; Adorno-Martinez, W. E.; Aizenberg, J., Liquid-Infused Nanostructured Surfaces with Extreme Anti-Ice and Anti-Frost Performance. ACS Nano 2012, 6 (8), 6569-6577.

Ref 5: Golovin, K.; Dhyani, A.; Thouless, M. D.; Tuteja, A., Low-interfacial toughness materials for effective large-scale deicing. Science 2019, 364 (6438), 371.

Ref 6: He, Z.; Xiao, S.; Gao, H.; He, J.; Zhang, Z., Multiscale crack initiator promoted super-low ice adhesion surfaces. Soft Matter 2017, 13 (37), 6562-6568.

Ref 7: Upadhyay, V.; Galhenage, T.; Battocchi, D.; Webster, D., Amphiphilic icephobic coatings. Progress in Organic Coatings 2017, 112, 191-199.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of aspects of the present disclosure.

Materials.

Table 1 below describes some of the materials used in the examples herein.

TABLE 1

| Chemical Name | Commercial ID | Manuf. | CAS Number | Visc. (cSt) | MW (g/mol) | Specific Gravity |
|---|---|---|---|---|---|---|
| Polydimethylsiloxane-co-methylhydrosiloxane (Hydride resin) | | | | | | |
| Trimethylsilyl terminated methyl hydrogen silicone fluid | SiSiB ® HF2020 | SiSiB Silicones | 63148-57-2/9004-73-3 | 16-24 | N/A | 0.990-0.998 |
| Hydride terminated methylhydrosiloxane dimethylsiloxane copolymer | SiSiB ® HF2060 | SiSiB Silicones | 69013-23-6 | N/A | N/A | N/A |

TABLE 1-continued

| Chemical Name | Commercial ID | Manuf. | CAS Number | Visc. (cSt) | MW (g/mol) | Specific Gravity |
|---|---|---|---|---|---|---|
| Hydride terminated methylhydrosiloxane dimethylsiloxane copolymer | SiSiB® HF2068 | SiSiB Silicones | 115487-49-5 | N/A | N/A | N/A |
| Trimethylsilyl terminated methylhydrosiloxane dimeethylsiloxane copolymer | SiSiB® HF2050 | SiSiB Silicones | 68037-59-2 | N/A | N/A | N/A |
| Trimethyl or hydrogen terminated dimethyl diphenyl polysiloxane copolymer | SiSiB® HF2082 | SiSiB Silicones | N/A | N/A | N/A | N/A |
| (25-35% methylhydrosiloxane)-dimethylsiloxane copolymer, trimethylsiloxane terminated | HMS-301 | Gelest | 68037-59-2 | 25-35 | 1,900-2,000 | 0.98 |
| Polydimethylsiloxane-co-methylhydrosiloxane (Hydride resin) | | | | | | |
| Polymethylhydrosiloxane, trimethylsilyl terminated | HMS-992 | Gelest | 63148-57-2 | 26-35 | 1,800-2,100 | 0.99 |
| (25-35% methylhydrosiloxane)-dimethylsiloxane copolymer, trimethylsiloxane terminated | HMS-301 | Gelest | 68037-59-2 | 25-35 | 1900-2000 | 0.98 |
| (45-55% methylhydrosiloxane)-dimethylsiloxane copolymer, trimethylsiloxane terminated | HMS-501 | Gelest | 68037-59-2 | 10-15 | 900-1,200 | 0.96 |
| Silanol terminated polydimethylsiloxane | DMS-S15 | Gelest | 70131-67-8 | 45-85 | 2,000-3,500 | 0.96 |
| Modular Side Chain Groups | | | | | | |
| Polyalkylene glycol monoallyl ether | Polyglykol A 400 | Clariant | 27274-31-3 | ~35 | 400 | 1.09 |
| Polyalkylene glycol monoallyl ether | Polyglykol A 500 | Clariant | 27274-31-3 | ~58 | 500 | 1.09 |
| Polyalkylene glycol monoallyl ether, methyl terminated | Polyglykol AM 450 | Clariant | 27252-80-8 | 18-20 | ~450 | 1.052 |
| Polyalkylene glycol monoallyl ether, methyl terminated | Polyglykol AM 350 | Clariant | 27252-80-8 | 9-10 | ~320 | 1.03 |
| Polyalkylene glycol monoallyl ether, methyl terminated | Polyglykol AM 20/20 | Clariant | 52232-27-6 | 280-300 | ~2200 | 1.05 |
| Allyloxy(polyethylene oxide) (8-12 EO) | ENEA0260 | Gelest | 27274-31-3 | N/A | ~480 | 1.089 |
| Allyloxy(polyethylene oxide), methyl ether (6-8 EO) | ENEA0360 | Gelest | 27252-80-8 | N/A | ~350 | 1.03 |
| Allyloxy(polyethylene oxide) (1-4 EO) | ENEA0253 | Gelest | 27274-31-3 | N/A | ~200 | 1.004 |
| Monovinyl terminated polydimethylsiloxane, asymmetric | MCR-V21 | Gelest | 68951-99-5 | 80-120 | 5,500-6,500 | 0.97 |
| Monovinyl functional polydimethylsiloxane, symmetric | MCS-V212 | Gelest | 67762-94-1 | 16-24 | 1,200-1,400 | 0.97 |
| Allyltrimethylsilane | SIA0555.0 | Gelest | 762-72-1 | N/A | 114.26 | 0.7193 |
| (Perfluorodecyl)ethylene | 019129 | Oakwood Chemical | 30389-25-4 | N/A | 546 | 1.71 |
| 1-Hexene | 320323 | Sigma-Aldrich | 592-41-6 | N/A | 84 | 0.678 |
| Allyltriethoxysilane | SIA0525.0 | Gelest | 2550-04-1 | N/A | 204.34 | 0.903 |
| N-butyldimethylamine | D1506 | TCI America | 927-62-8 | N/A | 101.19 | 0.72 |
| Triethylamine | T0886 | Sigma-Aldrich | 121-44-8 | N/A | 101.19 | 0.726 |

TABLE 1-continued

| Chemical Name | Commercial ID | Manuf. | CAS Number | Visc. (cSt) | MW (g/mol) | Specific Gravity |
|---|---|---|---|---|---|---|
| Trimethylamine | TM CP350 | AirGas | 75-50-3 | N/A | 59.1103 | N/A |
| (N,N'-Dimethylaminopropyl)triethoxysilane | AB336017 | ABCR | 43108-00-5 | N/A | 249.42 | N/A |
| (N,N'-Dimethylaminopropyl)trimethoxysilane | 539287 | Sigma-Aldrich | 2350-86-1 | N/A | 207.34 | 0.948 |
| N,N'-Dimethylallylamine | AC407980050 | Fisher Scientific | 2155-94-4 | N/A | 85.15 | 0.741 |
| Solvent | | | | | | |
| Anhydrous Toluene | TX0732-6 | Merck | 108-88-3 | N/A | 92 | 0.867 |
| Xylene | 214736 | Sigma-Aldrich | 1330-20-7 | N/A | 106 | 0.86 |
| Anhydrous Dimethylformamide | DX1727-6 | Merck | 68-12-2 | N/A | 73 | 0.94 |
| Anhydrous Acetonitrile | AX0151-6 | Merck | 75-05-8 | N/A | 41 | 0.786 |
| Anhydrous Tetrahydrofuran | 137170 | Beantown Chemicals | 109-99-9 | N/A | 72 | 0.889 |
| Catalyst | | | | | | |
| Platinum-divinyltetramethyldisiloxane complex (low color) | SIP6831.2LC | Gelest | 68478-92-2 | N/A | 474.68 | 0.8852 |
| Dibutyltin dilaurate | 291234 | Sigma-Aldrich | 77-58-7 | N/A | 631.56 | 1.066 |
| Binder | | | | | | |
| Silanol terminated polydimethylsiloxane | DMS-S45 | Gelest | 70131-67-8 | 50,000 | 110,000 | 0.98 |
| Silanol terminated polydimethylsiloxane | DMS-S35 | Gelest | 70131-67-8 | 5,000 | 49,000 | 0.98 |
| Silanol terminated polydimethylsiloxane | DMS-S31 | Gelest | 70131-67-8 | 1,000 | 26,000 | 0.98 |
| Silanol terminated polydimethylsiloxane | DMS-S27 | Gelest | 70131-67-8 | 700-800 | 18,000 | 0.97 |
| Silanol terminated polydimethylsiloxane | DMS-S15 | Gelest | 70131-67-8 | 45-85 | 2,000-3,500 | 0.96 |
| Lubricant | | | | | | |
| C.I. Pigment Black 28 * CI Constitution #77428 * CPMA # 13-38-9 | Black 30C965 | Shepherd | 68186-91-4 | N/A | N/A | 5.4 |
| 8086 Rutile titanium dioxide pigment white 6 | LANSCO 8086 | Lansco Colors | 13463-67-7 | N/A | N/A | 4.25 |
| Fumed silica | Aerosil R972 | Evonik | 68611-44-9 | N/A | N/A | 2.2 |
| Sol-gel Lot: 906003/1 | VP1619 | Worlee | N/A | 30 | N/A | 0.86-0.92 |
| Sol-gel Part A Lot: A-0088 1805607 Nov. 16, 2018; Part B Lot: A-0099 05245 Oct. 31, 2018 | Gentoo | Ultratech | N/A | Pat A: 3.92 Part B: 1.11 | N/A | Part A: 0.898 Part B: 1.11 |
| Trifluoromethyl C1-4 Alkyl Dimethicone | DM-100 | Grant Industries | 63148-56-1 | N/A | N/A | 0.99 |
| Dimethylsiloxane-(25-30% ethylene oxide) block copolymer | DBE-224 | Gelest | 68938-54-5 | 400 | 10,000 | 1.02 |
| Dimethylsiloxane-(50-55% ethylene oxide) block copolymer | DBE-621 | Gelest | 68938-54-5 | 100 | 2,500 | 1.03 |
| Silicone PEG-PPG block copolymer (30-40% PEG, 30-40% PPG, 20-40% PDMS) | Commercial Lubricant 1 | BYK | N/A | N/A | 3,000-7,000 | 1.035 |

Synthesis of AM-24

Hydride resin (50.537 g, HMS-992, hydride Eq. Wt. 65) was transferred into a round bottom flask kept under a positive Argon atmosphere. Then, 39.091 g of allyltrimethylsilane (SIA 0555.0, hydride Eq. Wt. 114.26), 10.109 g of allyltriethoxysilane, 202.292 g of anhydrous toluene, were added in to the reaction flask. The content was allowed to mix till the reaction temperature reached near 80° C. Next, the catalyst, 146.8 mg of 2% Pt divinyl complex in xylene, mixed with additional 4.994 g of xylene was added in to the reaction. The content was stirred for 1 h. After 1 h of reaction, 384.313 g of anhydrous toluene was added followed by 199.610 g of allylPEG (Eq. Wt 500) to the reaction mixture. After 15 min of mixing, 301.7 mg of 2% Pt divinyl complex in xylene, mixed with additional 4.0038 g of xylene, was added to the reaction mixture. Reaction mixture was allowed to stir for 1 h. A chaser (24.9 mg of the same catalyst diluted in g of xylene) was added and continued stirring for 15 mins. The resin (AM-24) was cooled to room temperature and stored under Argon argon atmosphere.

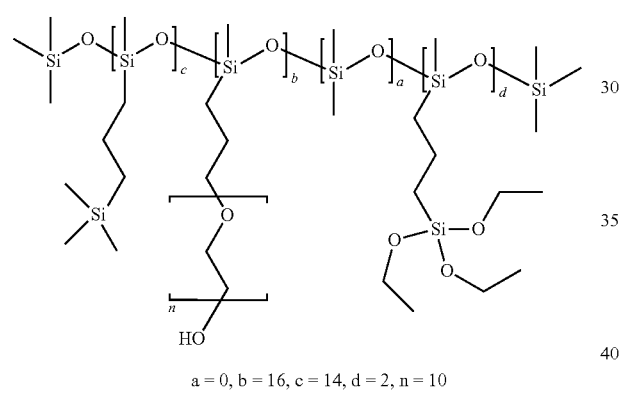

AM-24 a = 0, b = 16, c = 14, d = 2, n = 10

Synthesis of AM-26

Reaction was carried out under Argon. 10.179 g COP, 130 mL of anhydrous THF and 8.083 g of triethylamine were mixed into reaction flask. Flask was cooled to 0° C. 35.634 g of AllylPEG (Eq Wt 500) was added dropwise. The reaction mixture was allowed to stir for 1h after complete addition at 0° C. and then for 2 h at room temperature. The precipitates were removed through filtration and the volatiles were evaporated. Phosphorus NMR shows a peak at 19.1 ppm corresponding to reaction of COP and hydroxyl group of allylPEG. Dissolved residue in 60 mL anhydrous acetonitrile and add 24.011 g triethylamine. Heat the mixture at 80° C. for ~7 days. Phosphorus NMR shows peak at 0.87 ppm corresponding to ring opened structure forming allylPEG capped with zwitterion (POA-ZW-1).

In a reaction flask, 4.736 g of hydride resin (HMS-301 Eq Wt 250), 0.950 g of allyltriethoxysilane and 11.255 g of anhydrous toluene were combined. Mixture was stirred and heated to 80° C. Catalyst mixture containing 8.4 mg of Pt catalyst dissolved in 0.2913 g of xylene was added to the flask. Mixture was stirred for 1 h and then 20.511 g of toluene and 11.061 g of POA-ZW-1 synthesized in the first step was added. Additionally, 26.1 mg of Pt catalyst dissolved in 0.8018 g in xylene was added. Mixture was allowed to react for 1h. Chaser containing 3 mL of DMF and 22.7 mg of Pt catalyst was added. Then the mixture was heated for 2h then cooled to room temperature and stored under Argon.

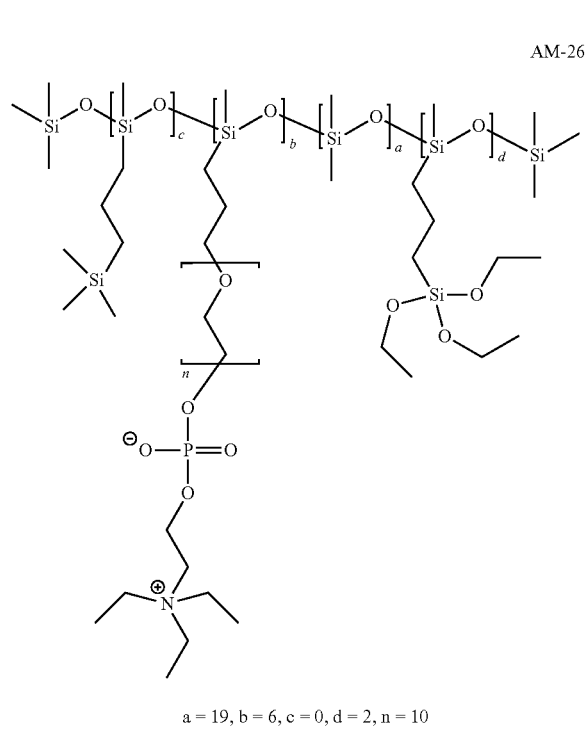

AM-26 a = 19, b = 6, c = 0, d = 2, n = 10

Synthesis of AM-48

Reaction carried out under Argon. Hydride resin (10.070 g, HMS-301, hydride Eq. Wt. 250) transferred into a round bottom flask kept under a positive Ar atmosphere. 2.093 g of allyl triethoxysilane, 15.637 g of anhydrous toluene, were added to the reaction flask. The contents were allowed to mix till the reaction temperature reached near 80° C., and then catalyst was added (16.5 mg of 2% Pt divinyl complex in xylene) and mixed with an additional 0.8045 g of xylene added to the reaction. The reaction was allowed the content to stir for 1 h, and after 1 h, 30.306 g of anhydrous toluene was added followed by addition of 15.138 g of allylPEG (Eq. Wt 500) to the reaction mixture. After 15 min of mixing, 29.0 mg of 2% Pt divinyl complex in xylene, mixed with 0.9112 g of xylene added to the reaction mixture. Reaction mixture was allowed to stir for 1 h, which concluded phase 1 of the synthesis. Resin was cooled with ice water, then followed by addition of 3.287 g of triethylamine to the reaction mixture with stirring, and then followed by dropwise addition of 4.43 g of COP to the reaction mixture. After complete addition, the reaction was stirred at room temperature for 1 h. Precipitates were removed by filtration, and volatiles were removed under high vacuum with temperature not exceeding 50° C. Phosphorus NMR showed a peak at 18.5 ppm indicating reaction of COP with hydroxyl group of Allyl PEG. Next, 60 mL of anhydrous acetonitrile and 5.937 g of N,N-dimethylbutylamine were added and the mixture was heated at 85° C. for 24 h. Phosphorus NMR at this stage indicated a large peak at 0.369 ppm and a small peak at 18.5 ppm corresponding to over 85% ring opening, thus forming zwitterionic species at the end of PEG chain. 1.876 g of additional N,N-Dimethylbutylamine was added and mixture was heated at 85° C. for additional 7 h. The structure was confirmed via NMR.

AM-48 a = 19, b = 6, c = 0, d = 2, n = 10

Synthesis of AM-55

Hydride resin (8.964 g, HMS-301, hydride Eq. Wt. 250) transferred into a round bottom flask kept under a positive Ar atmosphere. 37.931 g of Polyglykol AM/20-20 and 94.623 g of anhydrous Toluene are added and mixture is heated to 80° C. Add 25.4 mg of 2% Pt divinyl complex in xylene, mixed with additional 1.2182 g of xylene was added to the reaction such that the temperature remained within 5° C. Stir for 1 h. Add 2.060 g of Allyltrimethylsilane. Mix and add 7.1 mg of 2% Pt divinyl complex in xylene, mixed with additional 0.7952 g of xylene. Stir for 1h. The resin (AM-55) was cooled to room temperature under Argon atmosphere.

AM-55 a = 19, b = 4, c = 4, d = 0, n = 20

Synthesis of AM-58

Hydride resin (100.238 g, HMS-301, hydride Eq. Wt. 250) transferred into a round bottom flask kept under a positive Ar atmosphere. 22.897 g of allyltrimethylsilane (SIA 0555.0, hydride Eq. Wt. 114.26), 241.515 g of anhydrous toluene, were added in to the reaction flask. The content was allowed to mix till the reaction temperature reached near 80° C. Next the catalyst, 98.8 mg of 2% Pt divinyl complex in xylene, mixed with additional 3.9983 g of xylene was added in to the reaction. The content was stirred for 1 h. After 1 h of reaction, 191.943 g of anhydrous toluene was added followed by 100.404 g of allylPEG (Eq. Wt 500) to the reaction mixture. After 15 min of mixing, 100.2 mg of 2% Pt divinyl complex in xylene, mixed with additional 3.5375 g of xylene, was added to the reaction mixture. Reaction mixture was allowed to stir for 1 h. The resin was cooled to room temperature under Argon atmosphere.

Cool the mixture with dryice/acetone between 0-5° C. Add 26.456 g of triethylamine (distilled over calcium hydride). Add 28.690 g of 2-chloro-1,3,2-dioxaphospholane 2-oxide dropwise with vigorous stirring maintaining the reaction temperature between 0-5° C. Add additional 100 mL of anhydrous toluene. Stir for 2h at this temperature. Filter under anhydrous conditions using medium porosity airfree funnel. Remove volatiles under high vacuum with oil bath temperature set to 45° C.

Add 380 g of dry acetonitrile and 25.752 g of dry dimethylbutylamine. Heat the mixture under inert atmosphere at 73° C. Ring opening was followed by phosphorus NMR. Reaction was stopped when ~85% ring structure was open as evident from $^{31}P$ NMR. The resin (AM-58) was stored under inert atmosphere.

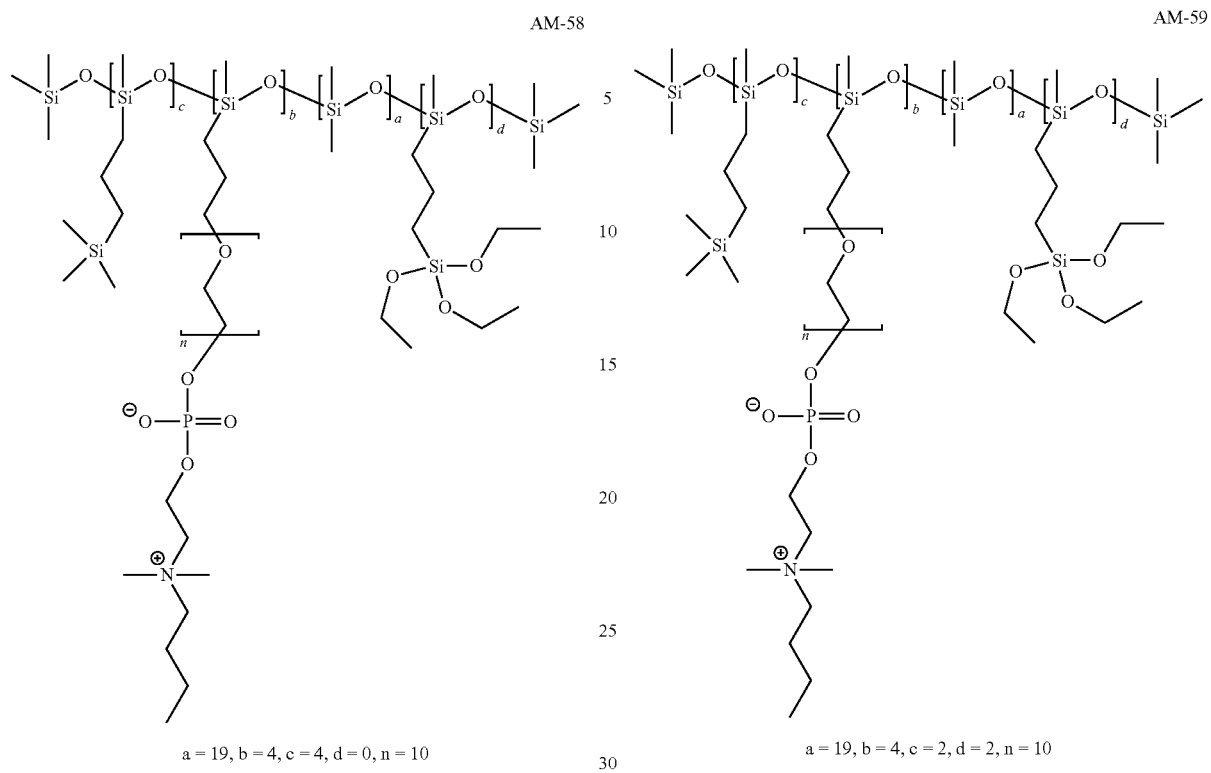

AM-58  a = 19, b = 4, c = 4, d = 0, n = 10

AM-59  a = 19, b = 4, c = 2, d = 2, n = 10

Synthesis of AM-59

Hydride resin (100.117 g, HMS-301, hydride Eq. Wt. 250) transferred into a round bottom flask kept under a positive Ar atmosphere. 11.653 g of allyltrimethylsilane (SIA 0555.0, hydride Eq. Wt. 114.26), 20.525 g of allyltriethoxysilane, 258.026 g of anhydrous toluene, were added in to the reaction flask. The content was allowed to mix till the reaction temperature reached near ° C. Next the catalyst, 98.7 mg of 2% Pt divinyl complex in xylene, mixed with additional 3.7725 g of xylene was added in to the reaction. The content was stirred for 1 h. After 1 h of reaction, 201.154 g of anhydrous toluene was added followed by 100.487 g of allylPEG (Eq. Wt 500) to the reaction mixture. After 15 min of mixing, 101.5 mg of 2% Pt divinyl complex in xylene, mixed with additional 3.5394 g of xylene, was added to the reaction mixture. Reaction mixture was allowed to stir for 1 h. The resin was cooled to room temperature under Argon atmosphere.

Cool the mixture with dryice/acetone between 0-5° C. Add 26.939 g of triethylamine (distilled over calcium hydride). Add 28.546 g of 2-chloro-1,3,2-dioxaphospholane 2-oxide dropwise with vigorous stirring maintaining the reaction temperature between 0-5° C. Add additional 100 mL of anhydrous toluene. Stir for 2h at this temperature. Filter under anhydrous conditions using medium porosity airfree funnel. Remove volatiles under high vacuum with oil bath temperature set to 45° C.

Add 414 g of dry acetonitrile and 27.267 g of dry dimethylbutylamine. Heat the mixture under inert atmosphere at 73° C. Ring opening was followed by phosphorus NMR. Reaction was stopped when ~85% ring structure was open as evident from $^{31}P$ NMR. The resin (AM-59) was stored under inert atmosphere.

Synthesis of AM-67

Reaction carried out under Argon. Hydride resin (115.008 g, HMS-301, hydride Eq. Wt. 250) transferred into a round bottom flask kept under a positive Ar atmosphere. 23.445 g of allyl triethoxysilane, 32.861 g allyltrimethylsilane and 381.370 g of anhydrous, were added to the reaction flask. The contents were allowed to mix till the reaction temperature reached near 80° C., and then catalyst was added (127.1 mg of 2% Pt divinyl complex in xylene and mixed with an additional 3.3937 g of xylene) added to the reaction. Reaction was allowed the content to stir for 1 h, and after 1 h, 28.875 g of allylPEG (Eq. Wt 500) was added to the reaction mixture. After 15 min of mixing, 33.2 mg of 2% Pt divinyl complex in xylene, mixed with 0.9247 g of xylene added to the reaction mixture. Reaction mixture was allowed to stir for 1 h, which concluded phase 1 of the synthesis. Resin was cooled with ice water, then followed by addition of 7.39 g of triethylamine to the reaction mixture with stirring, and then followed by dropwise addition of 8.276 g of COP to the reaction mixture. After complete addition, the reaction was stirred at room temperature for 1 h. Precipitates were removed by filtration, and volatiles were removed under high vacuum with temperature not exceeding 50° C. Phosphorus NMR showed a peak at 18.5 ppm indicating reaction of COP with hydroxyl group of Allyl PEG. Next, 240.47 g of anhydrous acetonitrile and 10.714 g of N,N-dimethylbutylamine were added and the mixture was heated at 85° C. for 48 h. Phosphorus NMR at this stage indicated a large peak at 0.369 ppm corresponding to the formation of zwitterionic structure at the end of PEG chain. Volatiles were evaporated under vacuum, gradually increasing the temperature of the bath to 70° C. Resin is brought to room temperature and 252 g of anhydrous Toluene was added.

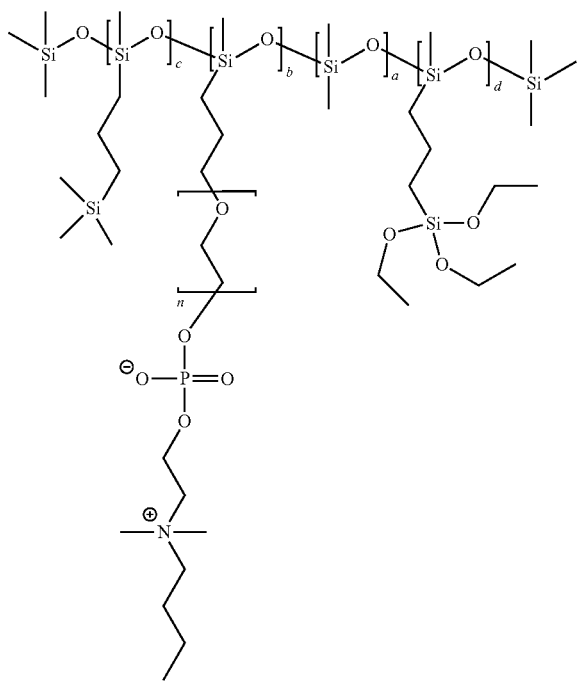

AM-67 a = 19, b = 1, c = 5, d = 2, n = 10

Exemplary Ice-Phobic Polymer Formulations

Exemplary ice-phobic polymer formulations were prepared using the materials and amounts as given in Table 2. These examples include formulations prepared with SAPs and lubricants in a binder resin that contain >65% silicone (PDMS) as a primary binder by solids content. The formulations were prepared by combining the silicone reins, pigments, fillers, lubricating oils, and surface-active polymer. The content was mixed thoroughly using a spatula or a speed mixer. Then the reactive crosslinker (Poly(diethoxysiloxane)) and catalyst (DBTDL) were added to the mixture. The content was thoroughly mixed using a spatula or a speed mixer. The formulation was then applied on a substrate directly or on a recommended tie-coat.

TABLE 2

| Material Name | Commercial Ref | 100153 | 100302 | 100284 | 100156 | 100204 |
|---|---|---|---|---|---|---|
| Binder/Filler/Pigment | | | | | | |
| Silanol Terminated Polydimethylsiloxanes | | 75.67% | 71.68% | 79.65% | 79.64% | 71.68% |
| Black Pigment | Black 30C965 | | | | | |
| White Pigment | LANSCO 8086 | | | | | |
| Filler | Aerosil R972 | | | | | |
| Pigments Total | | 0% | 0% | 0% | 0% | 0% |
| Pigments + Filler Total | | 0% | 0% | 0% | 0% | 0% |
| Lubricant | | | | | | |
| Fluorinated polysiloxane fluid | DM-100 | | | | | |
| Hydrophilic polysiloxane fluid | DBE-224 | | | | | |
| Hydrophilic polysiloxane fluid | DBE-621 | | | | | |
| Hydrophilic polysiloxane fluid | Commercial Lubricant 1 | 10.00% | 10.00% | | | 10.00% |
| Zwitterionic fluid (35% in acetonitrile) | AM-58 | | | 10.00%* | | |
| Sidechain Functionalized Organosiloxane | | | | | | |
| Surface-active polymer (33% in toluene) | AM-24 | | | | | 9.00%* |
| Surface-active polymer (35% in acetonitrile) | AM-59 | | 9.00%* | | | |
| Surface-active polymer (32.50% toluene and DMF) | AM-26 | 4.5%* | | | 10.00%* | |
| Other ingredients | | | | | | |
| Poly(Diethoxysiloxane) | PSI-021 | 9.04% | 8.57% | 9.52% | 9.52% | 8.57% |
| Dibutyltin dilaurate | DBTDL | 0.79% | 0.75% | 0.83% | 0.83% | 0.75% |
| Total | | 100 | 100 | 100 | 100 | 100 |

*Considered at 100% Solids

Further exemplary ice-phobic polymer formulations were prepared using the materials and amounts as given in Table 3. These examples include formulations prepared with SAPs in a binder resin that is 40% silica solgel by solids content. The formulations were prepared by combining the surface-active polymers and the binders. The solution was stirred according to the manufacturers guidelines to allow enough hydrolysis. The formulation was then applied onto the substrate directly or on a recommended adhesion promoter.

at 45° off vertical and the temperature changes required to achieve frosting were imposed on the plate. Two different digital microscope probes were positioned perpendicular to the specimen surfaces and frost formation was monitored. A surface mounted RTD (accuracy: ±0.1° C.) was used to monitor temperature throughout the tests. The roughness parameters of the coated samples and uncoated samples are measured using optical depth profiling technique.

Figure 3:
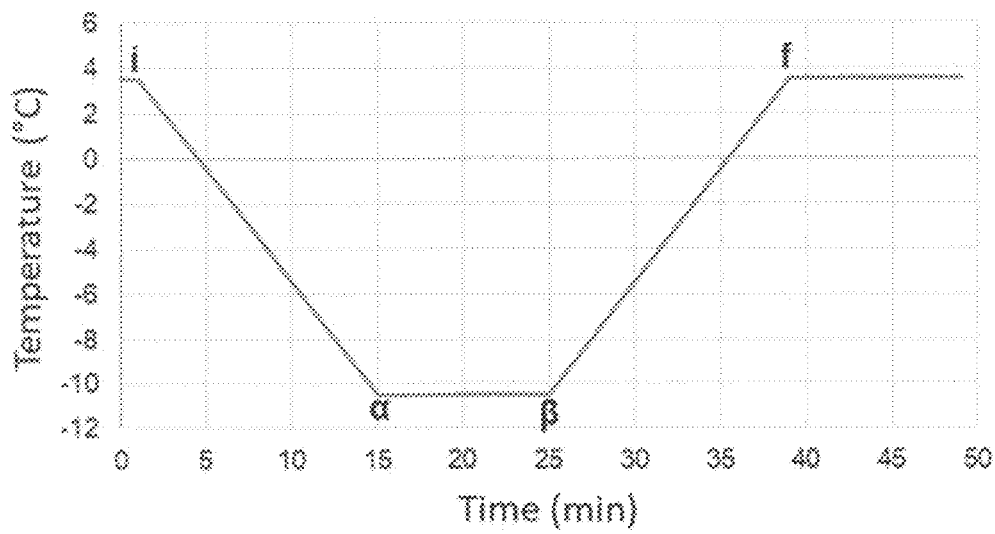
FIG. 3 shows a representative Peltier plate temperature profile using for frost mitigation testing as described herein. Briefly, the substrates were allowed 20 min to equilibrate to the initial environmental temperature (3.5° C.) within the chamber before a temperature ramp was imposed on the plate. As shown, the thermal profile consisted of a ramp from 3.5° C. to −10.5° C. at a rate of 1° C./min, followed by a hold for 10 min at −10.5° C., and finally a ramp back to 3.5° C. at 1° C./min.

FIG. 3 shows a representative Peltier plate temperature profile using for frost mitigation testing as described herein.

TABLE 3

| Material Name | Commercial Ref | 600025 | 600026 | 600029 | 600030 | 600031 |
|---|---|---|---|---|---|---|
| Sol-gel A (17.5% in n-propanol) | Gentoo | 95.00% | 90.00% | | | |
| Sol-gel B (39.00% in n-propanol) | VP1619 | | | 95.00% | 95.00% | 95.00% |
| Surface-active polymer (33% in toluene) | AM-24 | | | 5.00% | | |
| Surface-active polymer (32.50% solids) | AM-26 | 5.00% | 10.00% | | 5.00% | |
| Surface-active polymer (35% in acetonitrile) | AM-59 | | | | | 5.00% |
| Total | | 100% | 100% | 100% | 100% | 100% |

*All ingredient quantities provide above are considered at 100% solids.

Ice Adhesion Testing

The testing was conducted at Cold Regions Research and Engineering Laboratory (CRREL) Research and Development Center headquartered in Hanover, NH. Aluminum samples are coated with each coating variant. Samples are attached to a cold plate and ice is directly grown onto the sample using DI water (upside down setup, the sample moves as the ice freeze and grow). Once the ice is formed to a thickness of ~1 cm, the ice is pushed-off from the surface by shear force. The maximum force required to shear off the ice is recorded. FIG. 2 shows representative data of the average apparent ice adhesion strength (kPa) for representative disclosed test surfaces. The data show that Teflon and fluoropolymer (low surface energy) have the highest apparent ice adhesion whereas the coating variant 100153 with AM-26 show lower apparent ice adhesion. Additionally, the ice frozen at –8° C. on coating 100153 was reported to be extremely fragile leading to <20 kPa ice adhesion values. Ice frozen at –15° C. on the same coating reported to have an average ice adhesion value around 30 kPa. Thus, the coating systems described herein can reduce the ice formation temperature. FIG. 2 is a graph of the average apparent ice adhesion strength (kPa) for exemplary test surfaces compared to representative surfaces coated with disclosed ice-phobic polymer formulations. The apparent ice adhesion (kPa) for experimental formulation 100153 is significantly lower than standard Teflon. The apparent ice adhesion value for experimental formulation 600025 is lower than that of the Teflon surface.

Frost Mitigation Testing

The testing was conducted at Cold Regions Research and Engineering Laboratory (CRREL) Research and Development Center headquartered in Hanover, NH. Aluminum samples are coated with each coating variant. Specimens were rinsed with water before testing. All tests were carried out in a temperature and humidity-controlled chamber (Model MK115, Binder, Inc.), which was set to maintain 12° C. (accuracy: ±1° C.) and 70% RH (accuracy: ±5%). Specimens were mounted to a Peltier plate, which was positioned Briefly, the substrates were allowed 20 min to equilibrate to the initial environmental temperature (3.5° C.) within the chamber before a temperature ramp was imposed on the plate. As shown, the thermal profile consisted of a ramp from 3.5° C. to –10.5° C. at a rate of 1° C./min, followed by a hold for 10 min at –10.5° C., and finally a ramp back to 3.5° C. at 1° C./min.

Figure 4B:
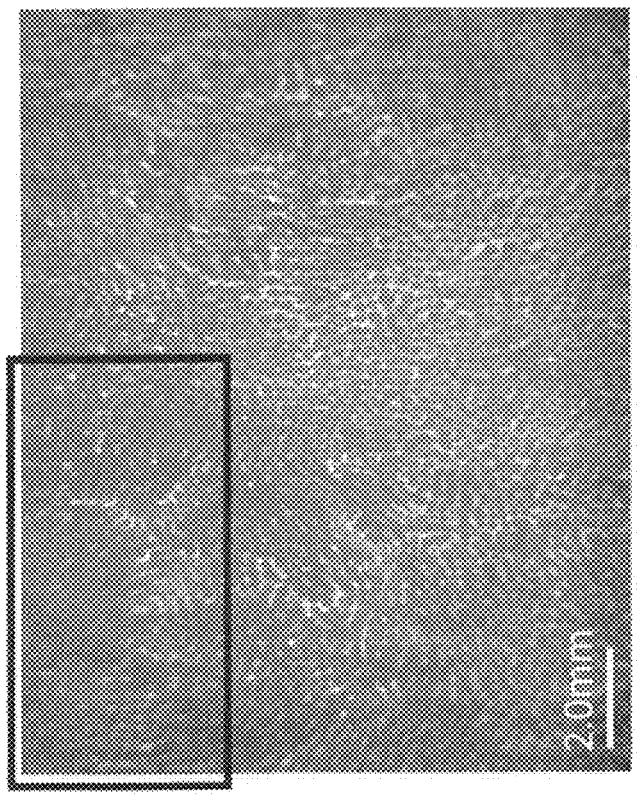
FIGS. 4A-4B show representative photographic images obtained during frost mitigation testing.
Figure 4A:
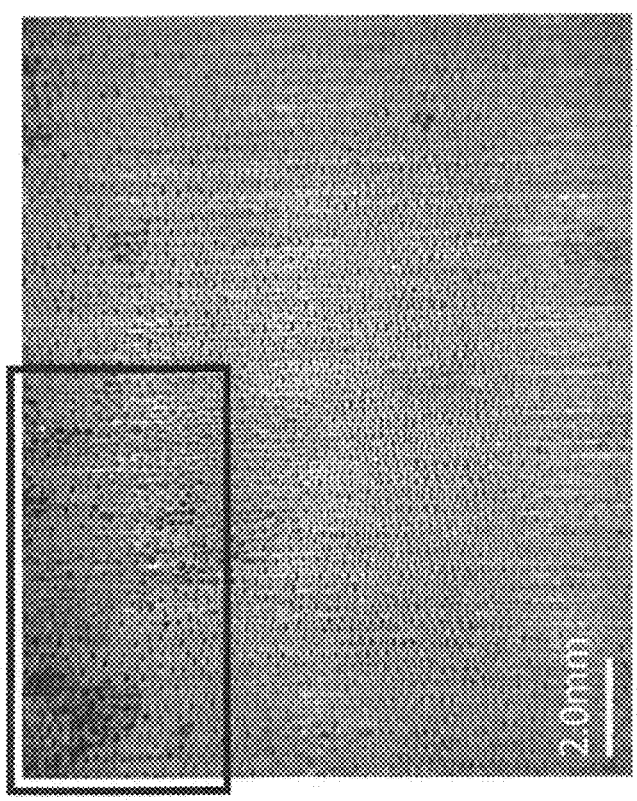

FIGS. 4A-4B show representative photographic images obtained during frost mitigation testing. FIG. 4A shows an image demonstrating that the frosting is associated with the transition of shiny transparent droplets to matte opaque droplets. FIG. 4B shows an image demonstrating that frosting of the surface is completed when there is absence of shiny droplets remaining on the surface. These are representative microscope images of the center of the surfaces taken at the time and temperature recorded for onset frosting and completion of frosting.

Figure 5B:
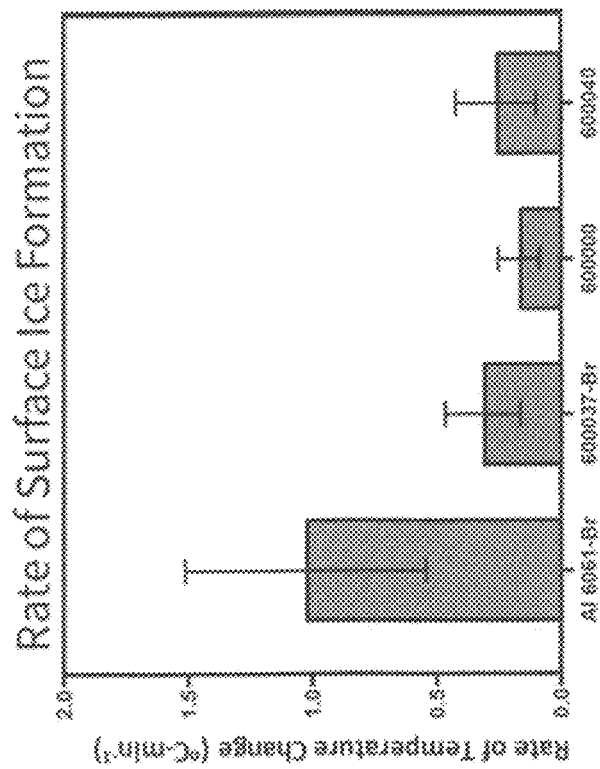
FIGS. 5A-5B show representative data obtained from frost mitigation testing using test surfaces.
Figure 5A:
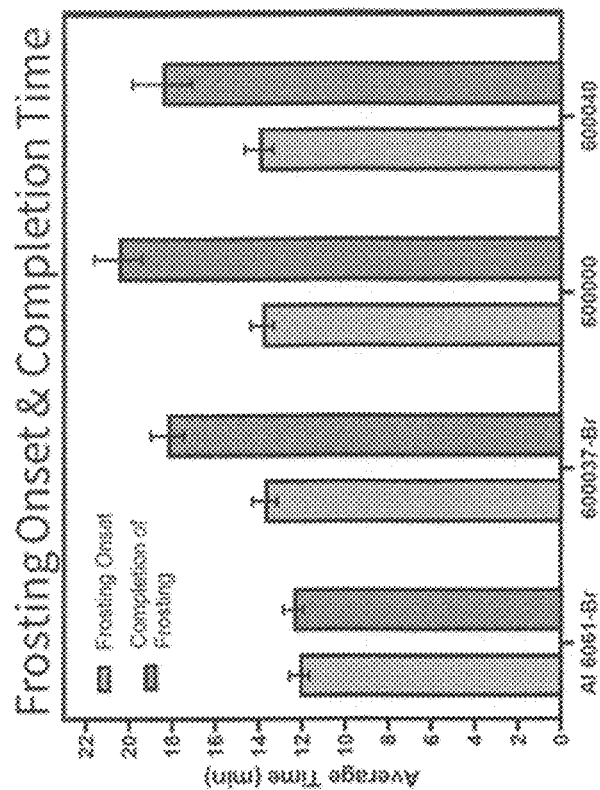

FIGS. 5A-5B show representative data obtained from frost mitigation testing using test surfaces. FIG. 5A shows data for the average time for the onset of frosting and completion of frosting with test surfaces as shown in the figure. The data show that representative disclosed materials outperformed aluminum 6061 control, i.e., it takes longer for frosting on surfaces coated with representative disclosed ice-phobic polymer formulations to complete compared to the aluminum 6061 control. FIG. 5B shows for the rate of surface ice formation. The data show that surfaces coated with representative disclosed ice-phobic polymer formulations outperformed aluminum 6061 control, i.e., rate of surface ice formation on surfaces comprising representative disclosed compositions is slower compared on aluminum 6061 control.

Figure 6:
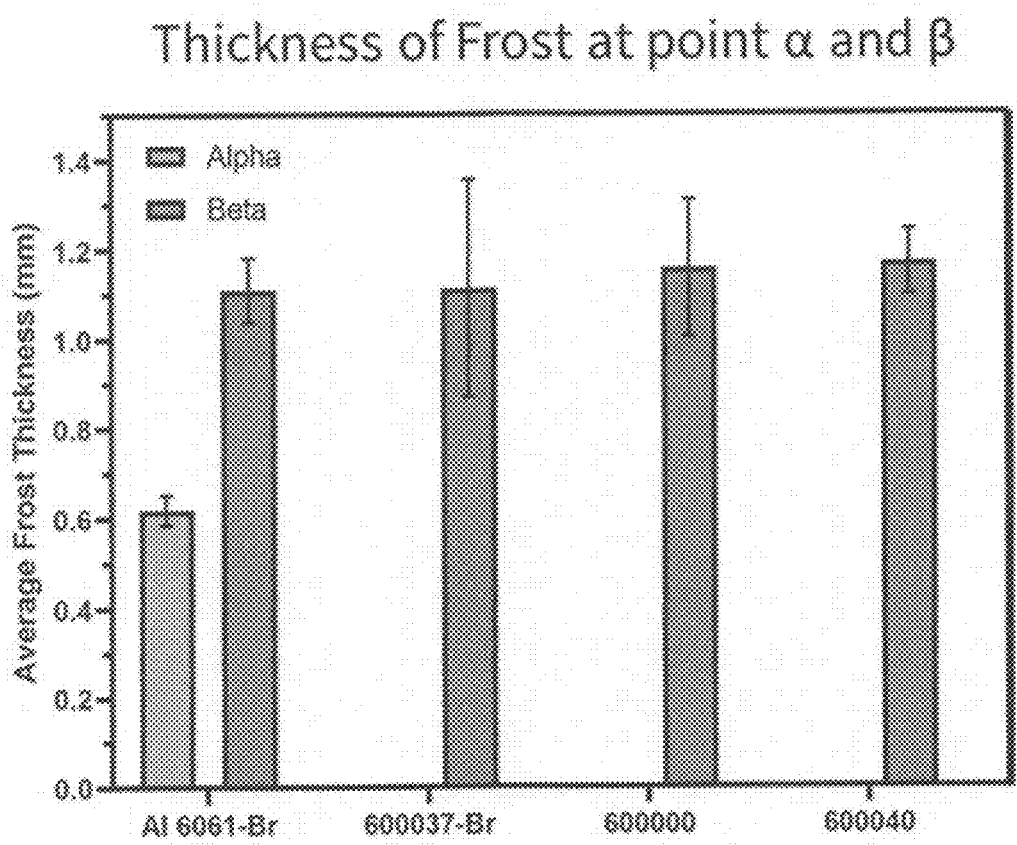
FIG. 6 shows representative data for average frost thickness at time points α (t=15 minutes) and β (t=25 minutes; see FIG. 3 regarding time points α and β). Within the first 15 minutes the aluminum 6061 has accumulated frost whereas the surfaces comprising representative disclosed compositions have not accumulated any.

FIG. 6 shows representative data for average frost thickness at time points α (t=15 minutes) and β (t=25 minutes; see FIG. 3 regarding time points α and (3). Within the first 15 minutes the aluminum 6061 has accumulated frost whereas the surfaces comprising representative disclosed compositions have not accumulated any.

FIGS. 7A-7H show representative photographic images of liquid water droplets on test surfaces. FIG. 7A shows photographic image obtained of a test surface (comprising a representative disclosed composition, AST coating prototype 600037) at time point α and shows that liquid water droplets are on the surface. In contrast, FIG. 7C a photographic image obtained of a test surface (control surface, aluminum 6061) at time point α and shows that which shows that all water on the aluminum 6061 surface has frosted over. FIG. 7B shows a photographic image obtained of a test surface (comprising a representative disclosed ice-phobic polymer formulation #600037) at time point β and shows that after 25 minutes of ice accumulation the underlying surface is still. In contrast, FIG. 7D shows a photographic image obtained of a test surface (control surface, aluminum 6061) at time point β and shows that the ice coverage on the surface is more uniform. FIGS. 7E-7H show the cross sections of the surfaces and are used to measure the frost thickness for each of FIGS. 7A-7D, respectively. The scalar bar is shown in the lower left of each image.

In FIG. 7E, the image shows that there are transparent/shiny droplets present indicating that the surface has not frosted over and there is not measurable frost on the surface. In contrast, the image shown in FIG. 7G indicates that the cross section is matte/opaque indicating that frost has started to accumulate and the thickness is measurable. In FIGS. 7F and 7G, showing cross sections a representative disclosed ice-phobic polymer formulation #600037 and aluminum 6061, respectively, show that at time point β the frost thickness is similar but the frost on the aluminum is denser as the reflection from the ice is more prominent. The image shows that a coating comprising representative disclosed ice-phobic polymer formulation #600037 demonstrates is more subtle and gray indicating that the frost growth is not as dense at the aluminum 6061.

Figure 8B:
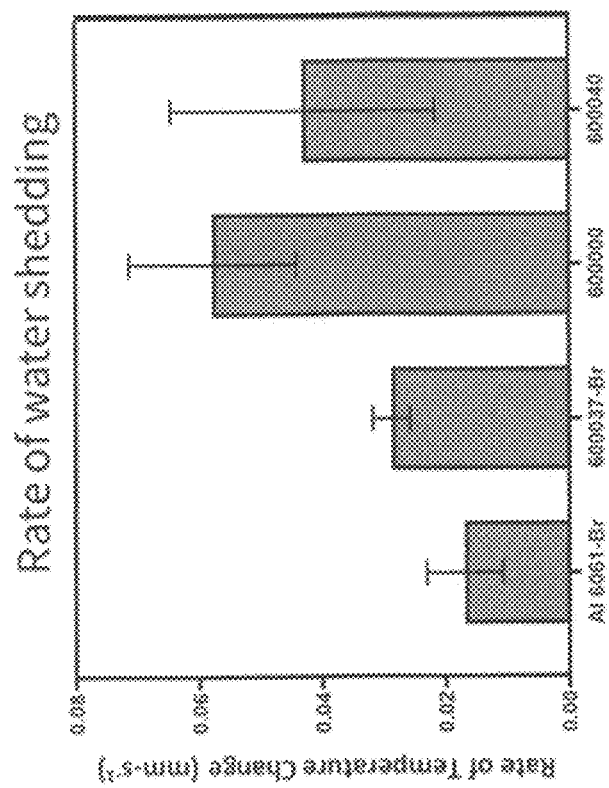
FIGS. 8A-8B show representative data for shedding of water from a test surface.
Figure 8A:
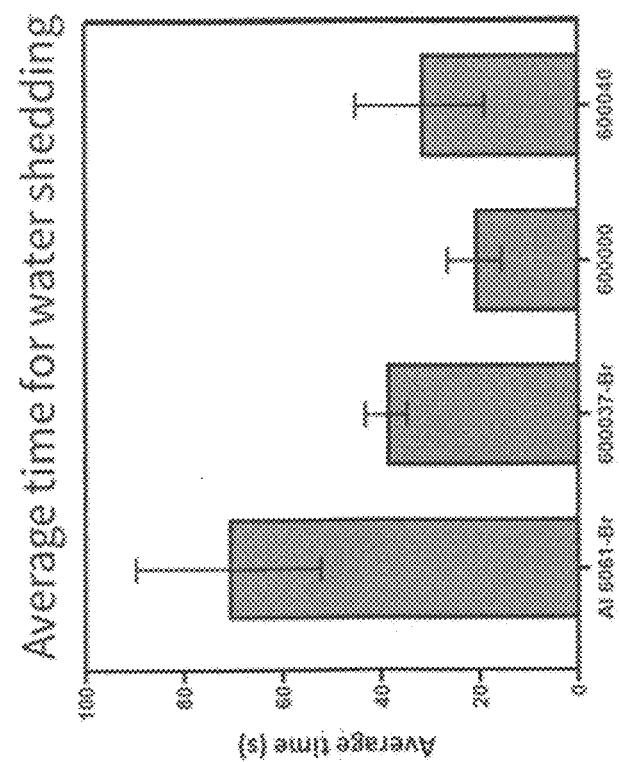

FIGS. 8A-8B show representative data for shedding of water from a test surface. FIG. 8A shows data for average time of water shedding from a test surface as labelled in the figure. The data show that once the frost has melted the test surfaces comprising representative disclosed compositions shed water from the surface faster as compared to the control surface having aluminum 6061. FIG. 8B shows the rate of water shedding from a test surface as labelled in the figure. The data show that compared to the aluminum 6061, test surfaces comprising representative disclosed compositions shed water at a faster rate.

Figure 9:
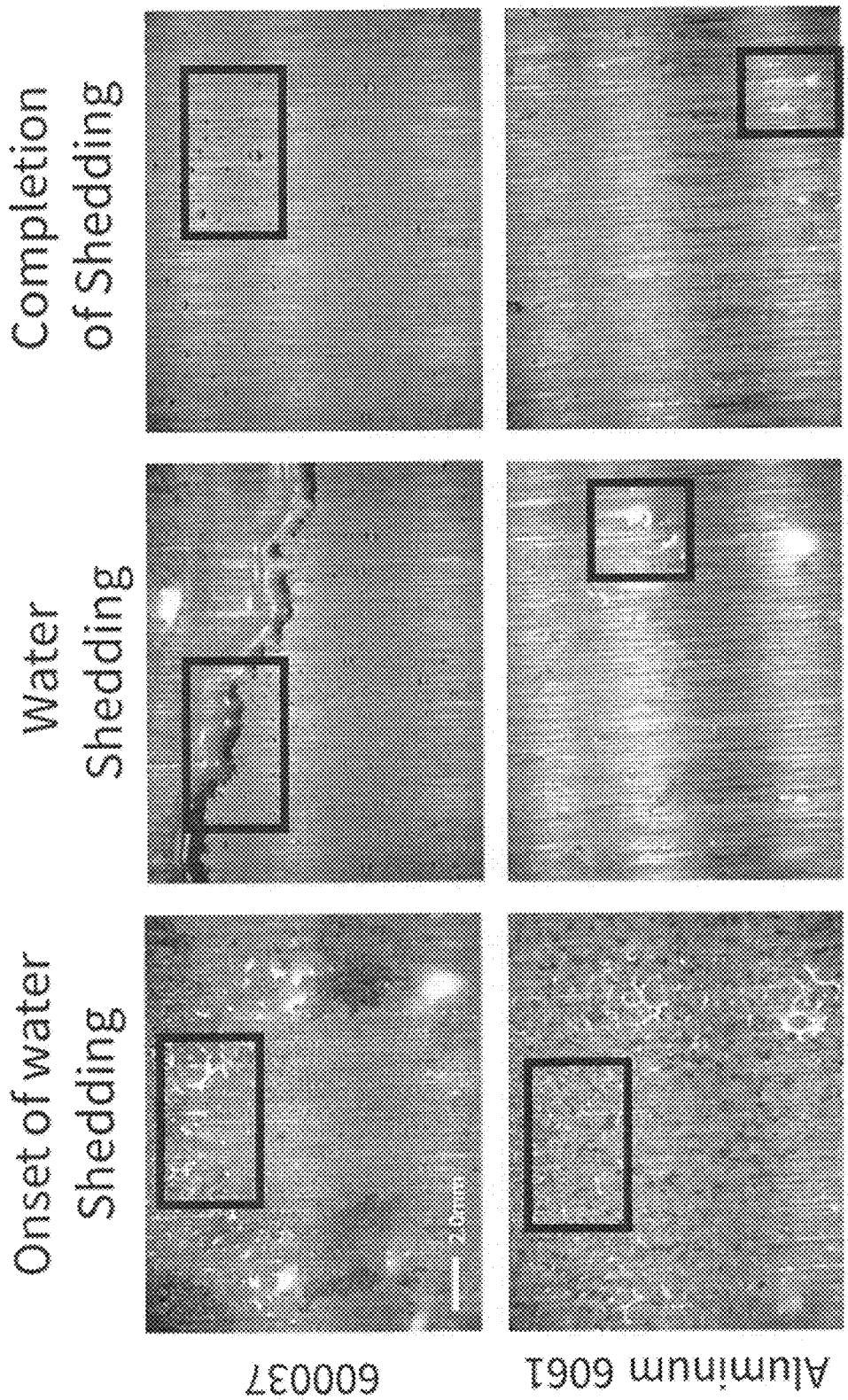
FIG. 9 shows a panel of photographic images capturing water shedding events over time after the frost on the surface has melted. The test surface comprised a representative disclosed composition (#600037) and is compared to a control surface (aluminum 6061). The data show that water shedding on the representative disclosed composition (#600037) is associated with clear de-wetting of water on the surface whereas on control surface (aluminum 6061) the de-wetting of water on the surface is somewhat less obvious. The control surface (aluminum 6061) is hydrophilic and thereby enables water to easily wet the surface. In contrast, the representative disclosed composition (#600037) is hydrophobic and thereby repels water.

FIG. 9 shows a panel of photographic images capturing water shedding events over time after the frost on the surface has melted. The test surface comprised a representative disclosed composition (#600037) and is compared to a control surface (aluminum 6061). The onset of shedding in both the surface coated with formulation #600037 and the control surface, aluminum 6061, is indicated by the reflection of a water layer forming on the surface. Formulation #600037 is more hydrophobic than aluminum 6061 and shows clear de-wetting of water on the surface whereas on aluminum 6061 this is not as clear. After the water shedding has completed there are circular small droplets (sub-micron size) of water remaining on formulation #600037 whereas the water droplets on the aluminum 6061 are millimeter size and highly irregular in shape. In applications where freeze-thaw cycling is present the shedding of water helps to mitigate the growth in subsequent cycles.

FIGS. 10A-10E show representative data pertaining to plate temperature profile and relative humidity profile in the frost mitigation test. FIG. 10A shows the plate temperature profile and the relative humidity profile. The environmental chamber is purged with nitrogen and the plate is cooled to −20° C. Once the plate equilibrates at −20° C. humidity introduced into the chamber and allowed to equilibrate at 70% RH. The surface is kept at −20° C. for 30 minutes after the humidity is introduced into the oven. FIG. 10B is a representative photographic image condensation frosting on a surface coated with a disclosed ice-phobic polymer composition, #600037, showing the presence of condensation frosting on the surface where the water condenses on the surface first and then transitions to frost. FIG. 10C shows an enlargement from the indicated area in FIG. 10B. FIG. 10D is a representative photographic image showing the deposition frosting on a control surface, aluminum 6061, and that sublimed water droplets directly frost onto the surface. FIG. 10E shows an enlargement from the indicated area in FIG. 10D. On the surface coated with formulation #600037, the onset of frosting occurs at 3 minutes and 20 seconds and it takes 3 minutes and 10 seconds for the surface to fully frost, i.e., all condensed water droplets transition to frost. On the control surface, aluminum 6061, the deposition is first detected at 3 minutes 15 seconds and it takes 2 minutes and 5 seconds for feathering frost to be present on the surface. Condensation frost is preferable in applications as droplets have a chance to grow and shed before transitioning to frost. This is not the case in deposition frosting.

Figure 18B:
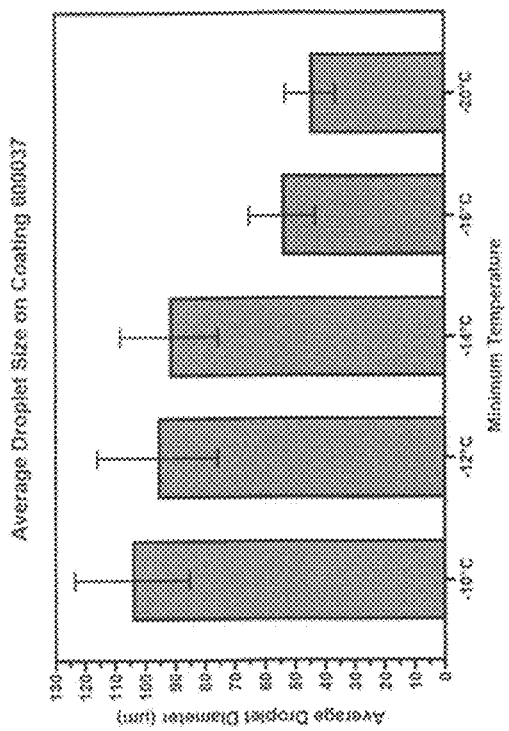
FIGS. 18A-18B show representative data obtained using the frost mitigation test described herein below.
Figure 18A:
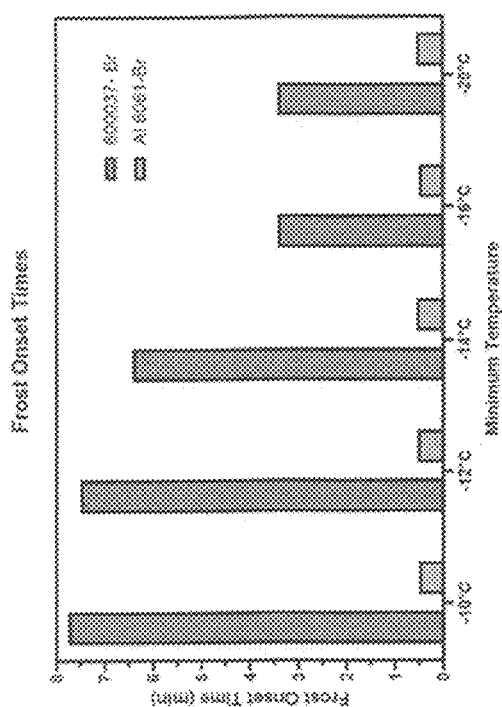

FIGS. 18A-18B show representative data obtained using the frost mitigation test described herein. FIG. 18A shows data relating temperature with frost onset time for a surface to frost on a surface coated with the representative disclosed composition (#600037) compared to a control surface (aluminum 6061). The data show that although the time for frosting to occur decreases for a surface coated with the representative disclosed composition (#600037) as the temperature decrease, it remains associated with condensation frosting, whereas the control surface shows deposition frosting. FIG. 18B shows data relating temperature with average droplet size on a surface coated with the representative disclosed composition (#600037) compared to a control surface (aluminum 6061). The data show that the water droplets on the surface are still measurable a surface coated with the representative disclosed composition (#600037), whereas the control surface is covered in a layer of frost within 30 seconds.

Roughness Testing

Figure 19A:
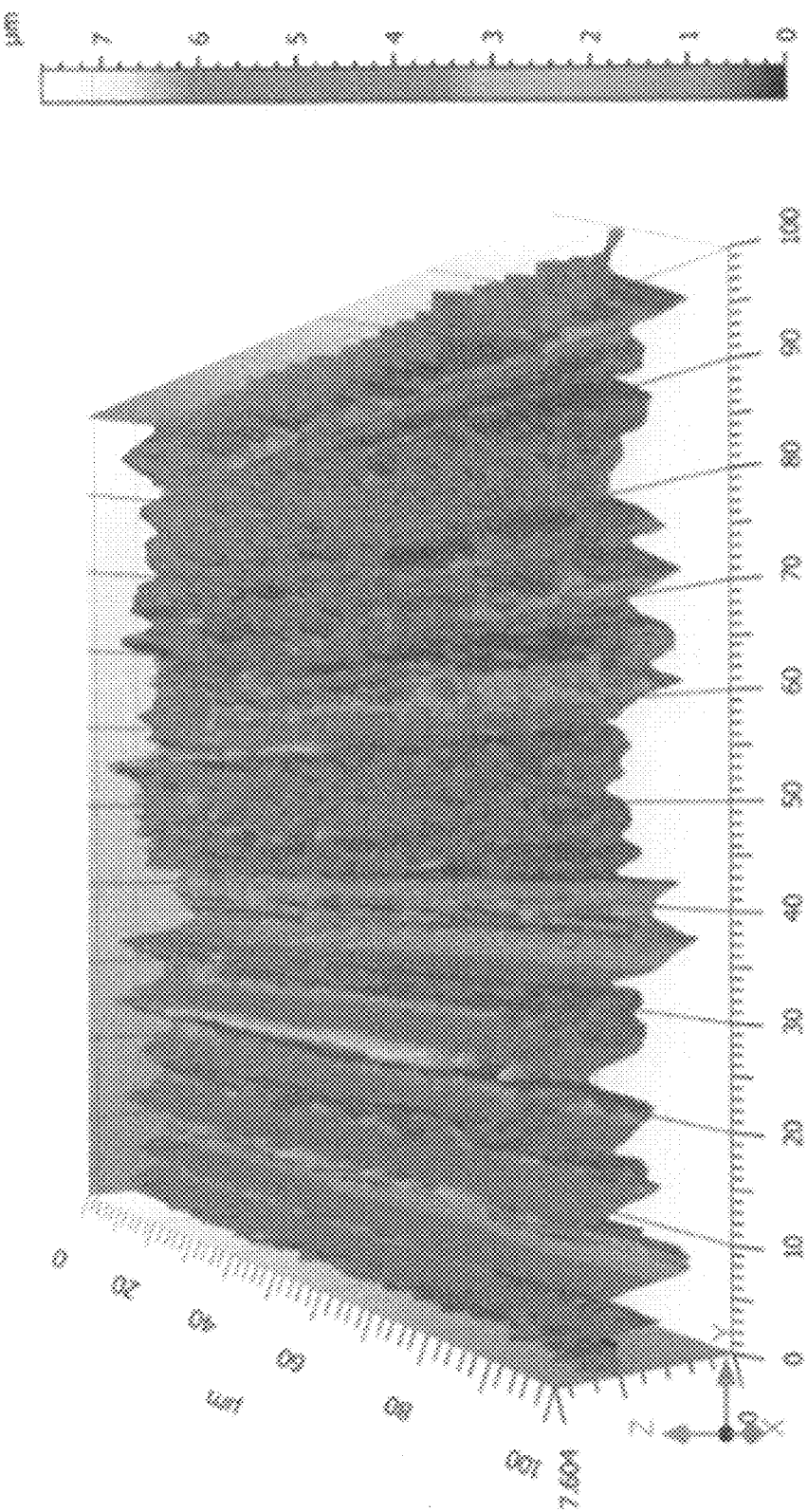
FIGS. 19A-19B show representative data for the determination of roughness parameters, Ra and Rz, in the frost mitigation test used to obtain the data shown in FIGS. 17A-17B and 18A-18B.
Figure 19B:
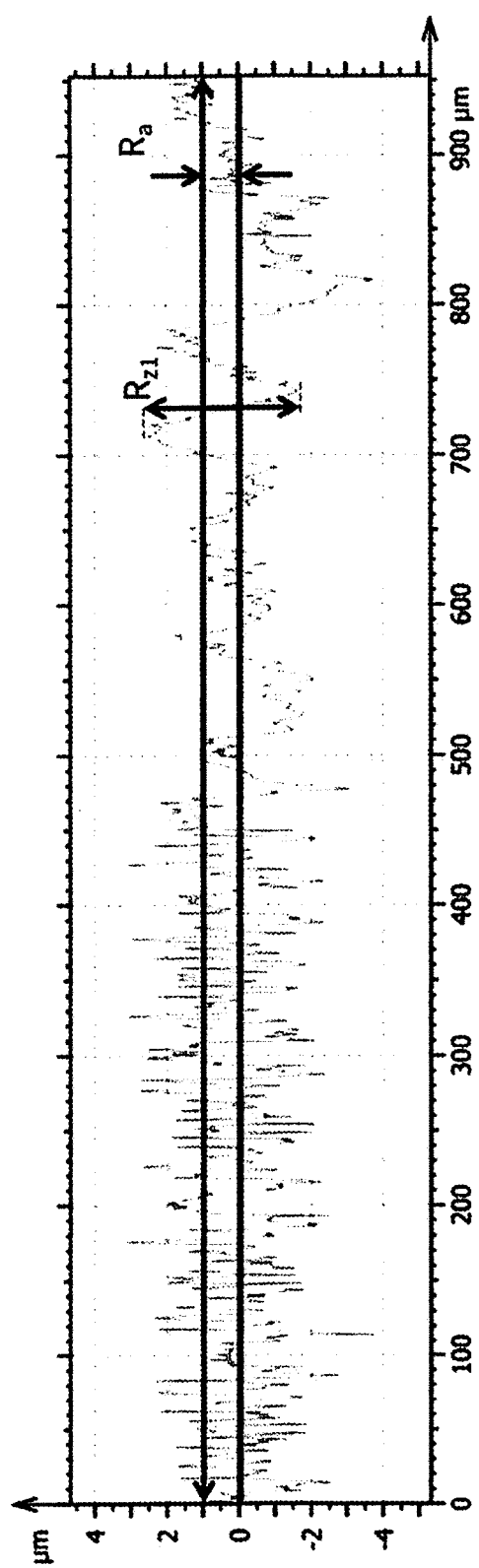

Aluminum 6061 with a brushed finish was cut in 4 cm×6 cm samples. Samples were coated with 600037 as described herein above. The roughness of the samples was measured using an optical method in order to construct the depth profile was constructed. These profiles were used to calculate surface roughness parameters. FIGS. 19A-19B show representative data for the determination of roughness parameters, Ra and Rz, in the frost mitigation test used to obtain the data shown in FIGS. 17A-17B and 18A-18B. FIG. 19A shows a representative depth profile of an area of a sample that is tested. FIG. 19B shows the line profile data extracted from the FIG. 19B. The roughness parameters $R_a$ (average roughness) and $R_z$ (difference between the highest peak and lowest valley) are calculated based on the parameters shown in the figure.

FIGS. 17A-17B show representative data obtained using the roughness test described herein. FIG. 17A shows data relating surface roughness in terms of Ra versus time for a surface to frost on a surface coated with the representative disclosed composition (#600037) compared to a control surface (aluminum 6061). FIG. 17B shows data relating surface roughness in terms of Rz versus time for a surface to frost on a surface coated with the representative disclosed composition (#600037) compared to a control surface (aluminum 6061). The data show the surface coated with the representative disclosed composition (#600037) has slower onset of frost formation compared to the control surface.

C. at 10° C./min. The onset melt temperature is reported from the heating curve. Formulations used in these studies are describe (materials and amounts used) in Tables 4-6 below.

TABLE 4*

| Material Name | Ref. | 600000 | 600026 | 600027 | 600038 | 600037 |
|---|---|---|---|---|---|---|
| Sol-gel B (39% solids in n-propanol) | | | | | | |
| Sol-gel A (17.5% solids in n-propanol) | Gentoo | 100% | 95% | 90% | 80% | 95% |
| Surface Active polymer (43% solids in toluene) | AM-48 | | | | | 5% |
| Surface Active polymer (32.50% solids) | AM-26 | | | 5% | 10% | 20% |
| Surface Active polymer (45% solids in acetonitrile) | AM-59 | | | | | |
| Total | | 100% | 100% | 100% | 100% | 100% |

| Material Name | Ref. | 600040 | 600043 | 600044 | 600045 | 600046 | 600047 |
|---|---|---|---|---|---|---|---|
| Sol-gel B (39% solids in n-propanol) | | 95% | | | | | |
| Sol-gel A (17.5% solids in n-propanol) | Gentoo | | 90% | 80% | 95% | 90% | 80% |
| Surface Active polymer (43% solids in toluene) | AM-48 | 5% | 10% | 20% | | | |
| Surface Active polymer (32.50% solids solids) | AM-26 | | | | | | |
| Surface Active polymer (45% solids in acetonitrile) | AM-59 | | | | 5% | 10% | 20% |
| Total | | | 100% | 100% | 100% | 100% | 100% |

Figures 11A, 11B, 11C:
FIGS. 11A-11C show representative data obtained using differential scanning calorimetry (DSC) pertaining to the effect of changing additive concentration on freezing point depression with the indicated coating.

*Data obtained for these formulations using DSC shown in FIGS. 11A-11C.

Without wishing to be bound by a particular theory, it is believed that the surface coated with the representative disclosed composition (#600037) decreases the surface roughness, rendering the surface smoother by covering surface defects (i.e., mitigating surface defects), and that in combination with the hydrophobic-zwitterionic surfaces provided by the disclosed ice-phobic polymer formulations, improves the frost formation on the surface, i.e., increases the time to onset of frost formation.

Differential Scanning Calorimetry (DSC) to Measure Freeze Point Depression of Water Differential Scanning calorimetry (TA Instruments Discovery DSC) was used to measure the freezing point depression of water due to the presence of a coating comprising a disclosed ice-phobic polymer formulation. The coatings were directly cast into standard aluminum DSC pans and cured at the relevant conditions. 8 uL of water was then added to the pan and hermetically sealed. The samples were maintained at room temperature for 24 h before testing. The samples were cycled as follows: 20° C. to −50° C. at 10° C./min, held at −50° C. for 10 min, ramp from −50° C. to 20°

TABLE 5**

| Material Name | Commercial Ref | 400068 | 400069 | 400070 |
|---|---|---|---|---|
| Polyurethane 1 | Lumiflon | 31.52% | 32.97% | 32.97% |
| Crosslinker 1 | Desmodur N3300 | 5.84% | 6.11% | 6.11% |
| Dibutyltin dilaurate | DBTDL | 0.004% | 0.004% | 0.004% |
| Surface Active polymer (43% solids solids) | AM-48 | 2.20% | 2.30% | |
| Surface Active polymer (45% solids in acetonitrile) | AM-59 | | | 2.30% |
| Hydrophilic polysiloxane fluid | Commercial Lubricant 1 | 4.39% | | |
| Solvent 1 | 2-heptanone | 56.04% | | |
| Total | | 100% | 100% | 100% |

Figure 12:
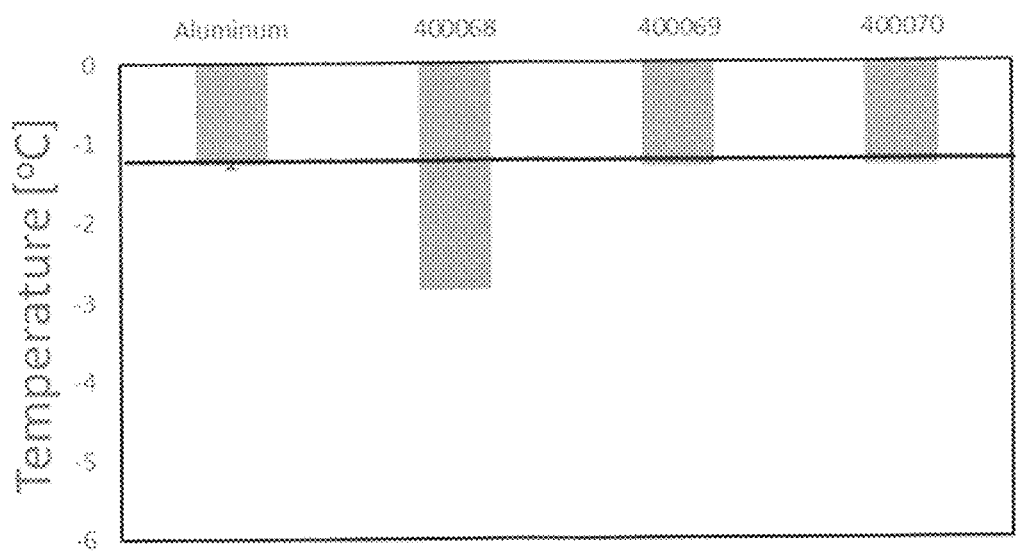
FIG. 12 shows representative data obtained using DSC pertaining to the effect of amphiphilic additives on freezing depression of water with the indicated coating (see Examples for disclosure of the specification formulations designated in the figure).

**Data obtained for these formulations using DSC shown in FIG. 12.

TABLE 6***

| Material Name | Ref. | 600068 | 600045 | 600037 | 600076 |
|---|---|---|---|---|---|
| Sol-gel A (17.5% in n-propanol) | Gentoo | 95% | 95% | 95% | 95% |
| Surface Active polymer (43% solids in toluene) | AM-48 | | | 5% | |
| Surface Active polymer (45% solids in acetonitrile) | AM-59 | | 5% | | |
| Surface Active polymer (46% solids in toluene) | AM-67 | 5% | | | |
| Surface Active polymer (56% solids in toluene) | AM-20 | | | | 5% |
| Total | | 100% | 100% | 100% | 100% |

***Data obtained for these formulations using DSC shown in FIGS. 13A-13B and FIGS. 14A-14B.

FIGS. 11A-11C show representative data obtained using differential scanning calorimetry (DSC) pertaining to the effect of changing additive concentration in Sol-gel A on freezing point depression with the indicated coating. FIG. 11A shows the freezing point depression with formulations comprising AM-26 with different additive concentrations as given in Table 4. FIG. 11B shows the freezing point depression with formulations comprising AM-48 with different additive concentrations as given in Table 4. FIG. 11C shows the freezing point depression with formulations comprising AM-59 with different additive concentrations as given in Table 4. The data show that the an optimum concentration for AM-26 and AM-48 is 5% which shows the earliest melting of ice. In this study, AM-59 decreases the melting point; however, AM-26 and AM-48 appear to be more effective under these conditions.

FIG. 12 shows representative data obtained using DSC pertaining to the effect of amphiphilic additives on freezing depression of water with the indicated coating (see Examples for disclosure of the specification formulations designated in the figure). The data show that the effect of the amphiphilic additives is dependent on the binder chemistry. In this example, the combination of two additives (400068) decreased the melting point of ice.

Figure 13A:
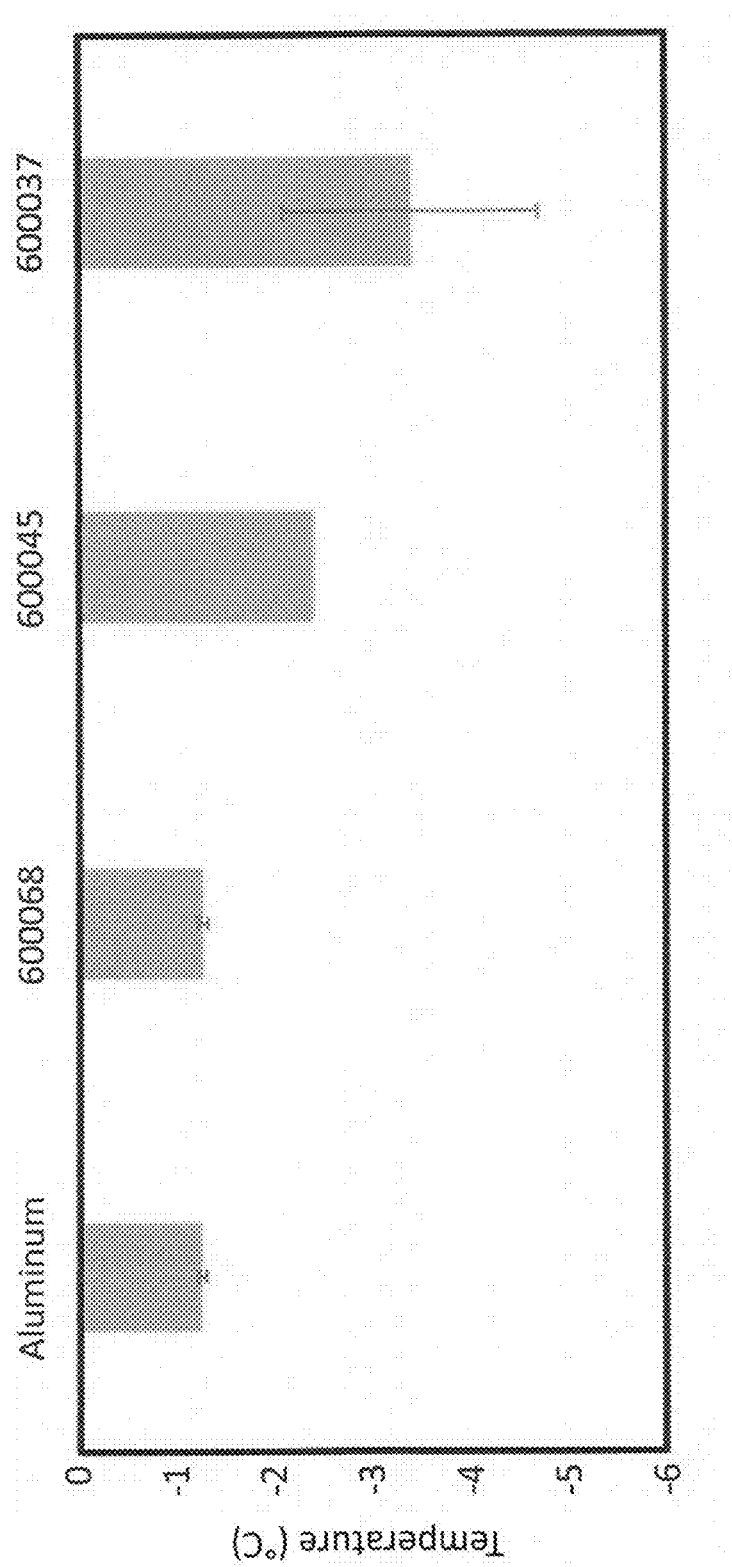
FIG. 13A shows representative shows representative data obtained using DSC pertaining to the effect of PEG-ZW grafts on freezing point depression with the indicated coating (see Examples for disclosure of the specification formulations designated in the figure). Chemical structures are shown in FIG. 13B for sidechain functionalized organosilane compounds used in the formulations designated in FIG. 13A.
Figure 13B:
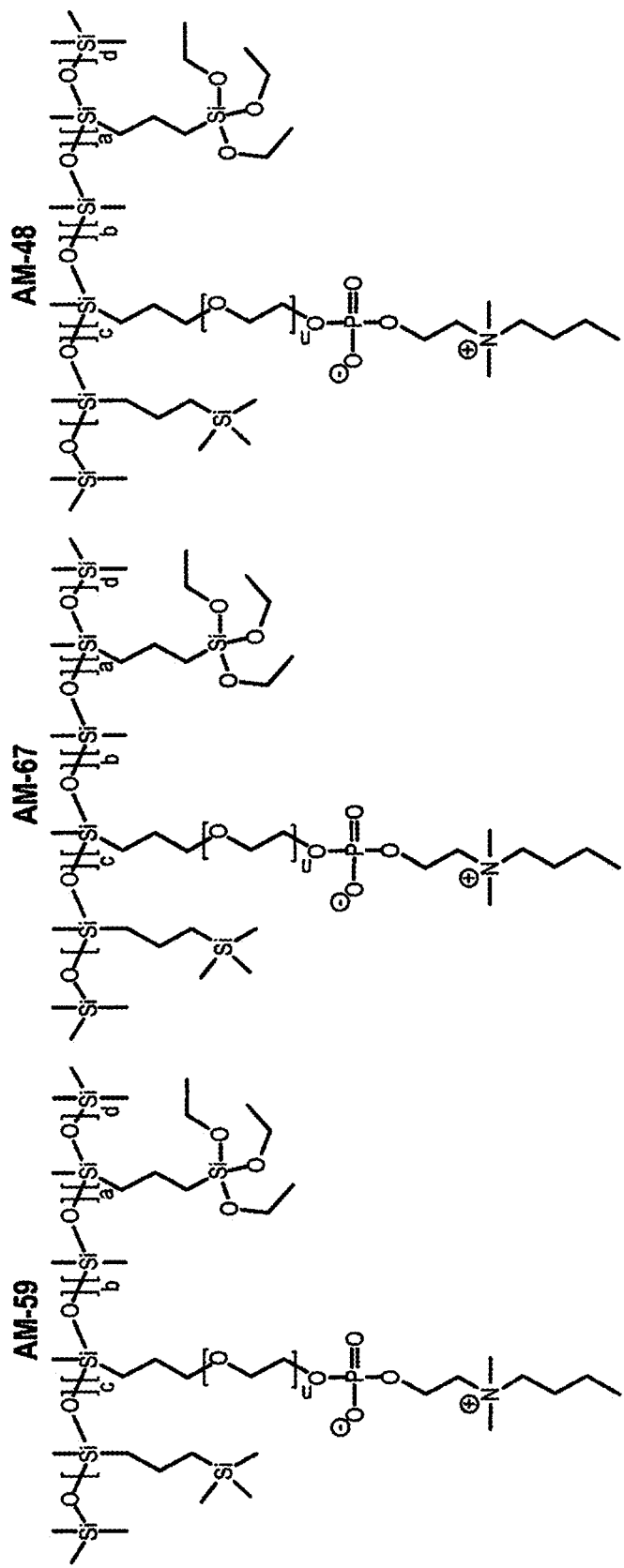

FIG. 13A shows representative shows representative data obtained using DSC pertaining to the effect of PEG-ZW grafts on freezing point depression with the indicated coating (see Examples for disclosure of the specification formulations designated in the figure). Chemical structures are shown in FIG. 13B for sidechain functionalized organosilane compounds used in the formulations designated in FIG. 13A. The data show that a greater number of PEG-ZW grafts is associated with improved freezing point depression of water. Without wishing to be bound by a particular theory, it is believe that a greater number of PEG-ZW grafts allows the formation of larger domains, thereby increasing the surface concentration and improving the freeze point depression of water.

Figure 14A:
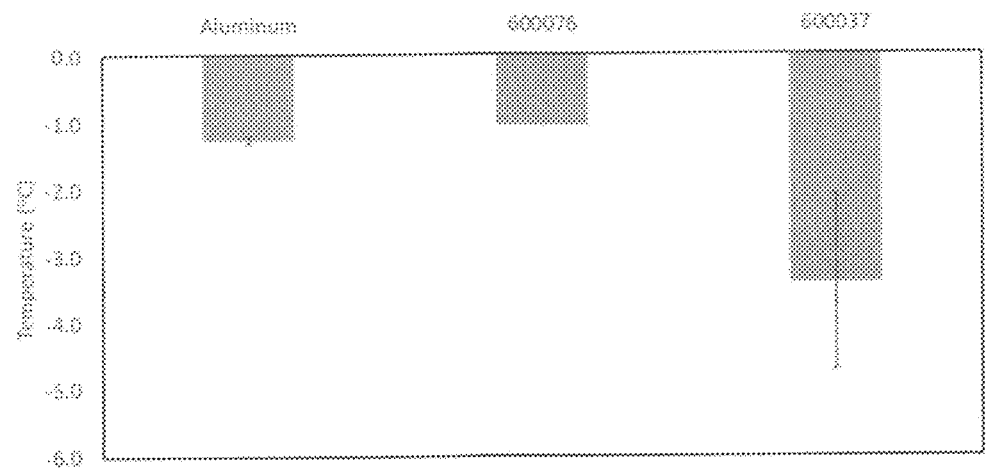
FIG. 14A shows representative shows representative data obtained using DSC pertaining to the effect of zwitterionic moieties on freezing point depression with the indicated coating (see Examples for disclosure of the specification formulations designated in the figure). Chemical structures are shown in FIG. 14B for sidechain functionalized organosilane compounds used in the formulations designated in FIG. 14A.
Figure 14B:
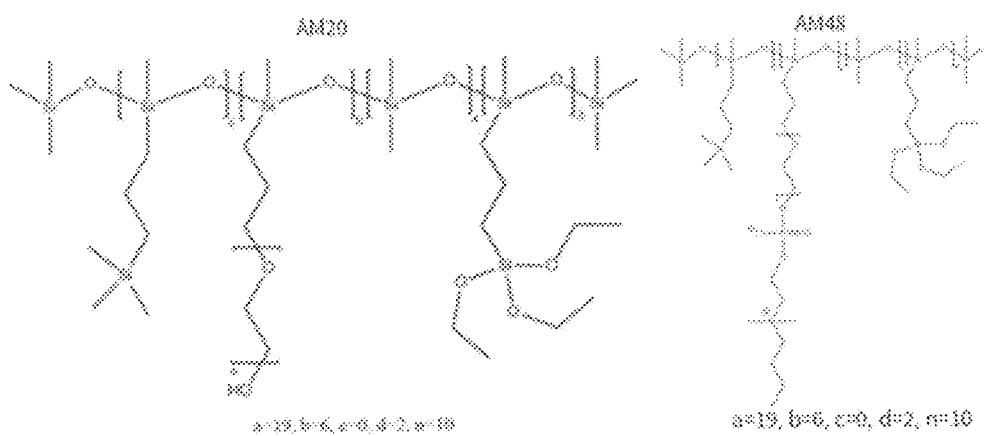

FIG. 14A shows representative shows representative data obtained using DSC pertaining to the effect of zwitterionic moieties on freezing point depression with the indicated coating (see Examples for disclosure of the specification formulations designated in the figure). Chemical structures are shown in FIG. 14B for sidechain functionalized organosilane compounds used in the formulations designated in FIG. 14A. The data show that the presence of zwitterionic moieties is associated with an improvement in the freezing point depression of water as compared to the same additive without the zwitterionic moiety.

Dynamic Frosting Test

Dynamic frosting tests were performed at Pennsylvania State University using the Adverse Environment Research Test Systems (AERTS). The testing was performed using the ice shedding measurement centrifuge stand. The cooling chamber was cooled to −8° C. and warm air with controllable humidity was injected into the cooling chamber to promote frost accretion to the samples. Control circular coupons (aluminum 6061) with a 1″ diameter were coated with formulations 600000 and 600037. The coupons were mounted onto the test beams. The test beams were allowed to spin for 4 minutes at 2000 rpm to accrete frost on the surface. The surfaces were then heated from the back at a rate of 1° C./minute. The time for ice to shed from the surface was measured.

Figure 15A:
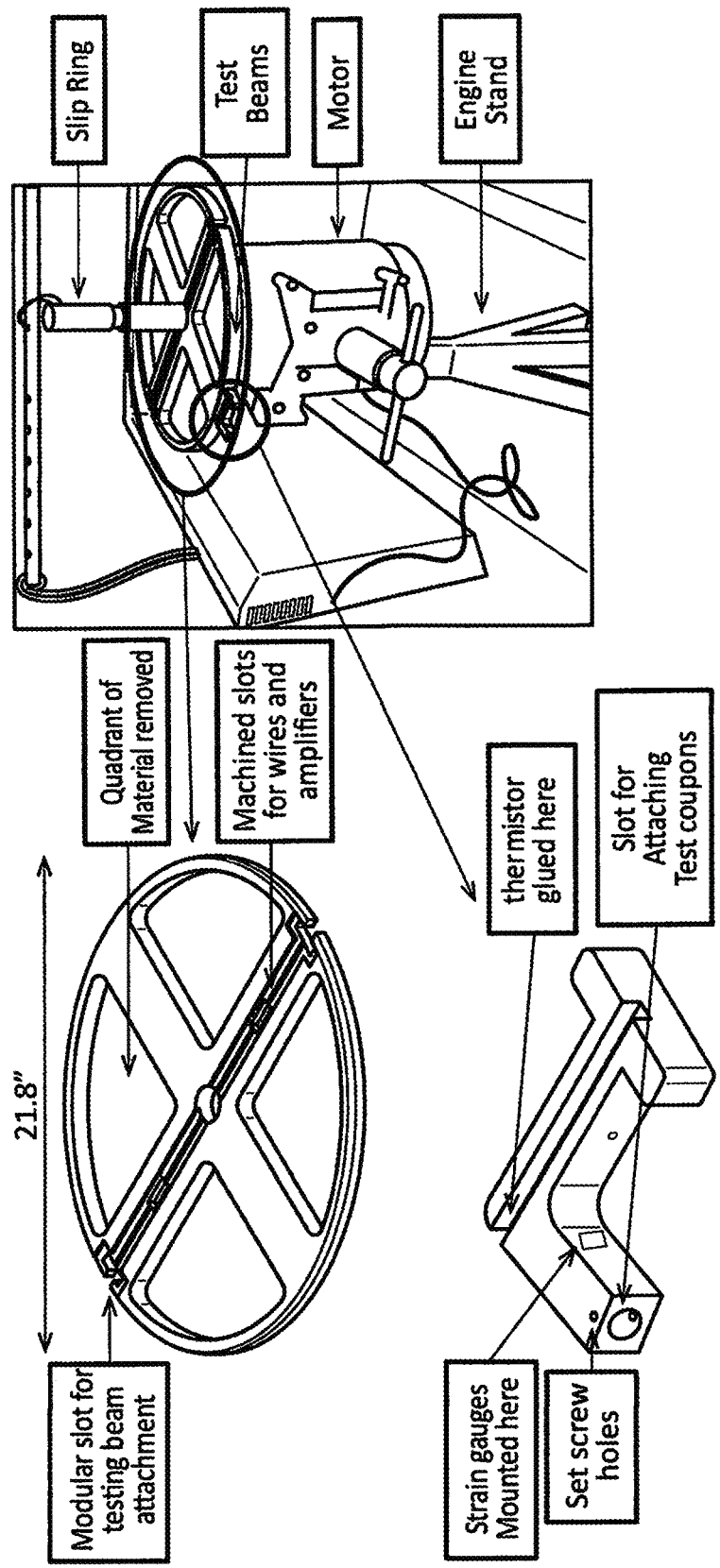
FIGS. 15A-15B show representative schematic diagrams of components of the apparatus used in the dynamic frosting test.
Figure 15B:
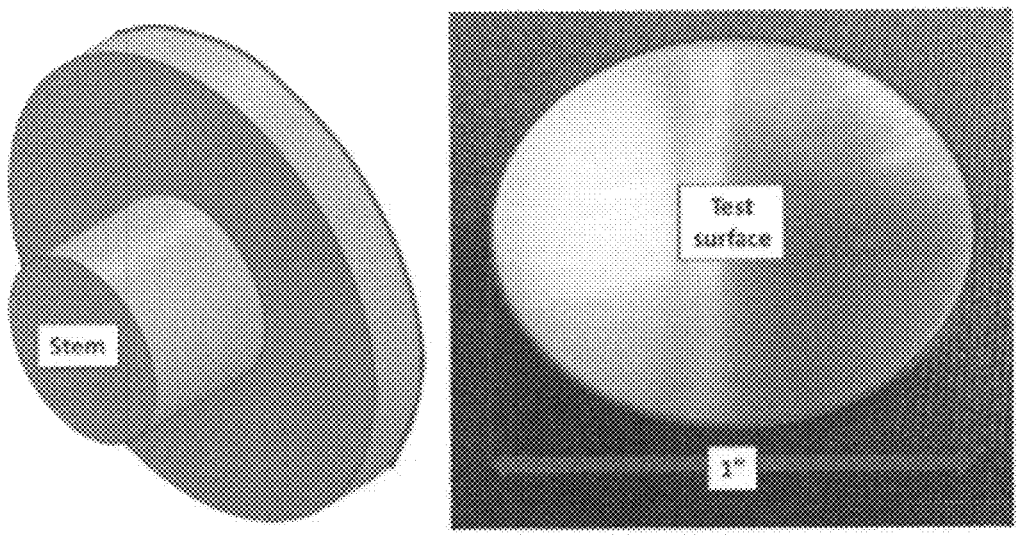

FIGS. 15A-15B show representative schematic diagrams of components of the apparatus used in the dynamic frosting test. FIG. 15A shows the ice shedding measurement centrifuge stand used to perform the dynamic frosting test. There were test beams which house the testing coupons attached to a rotating motor. The instrument is kept in an environmental chamber. FIG. shows the aluminum test coupons (1″ diameter) that were used for the dynamic frosting test.

Figure 16:
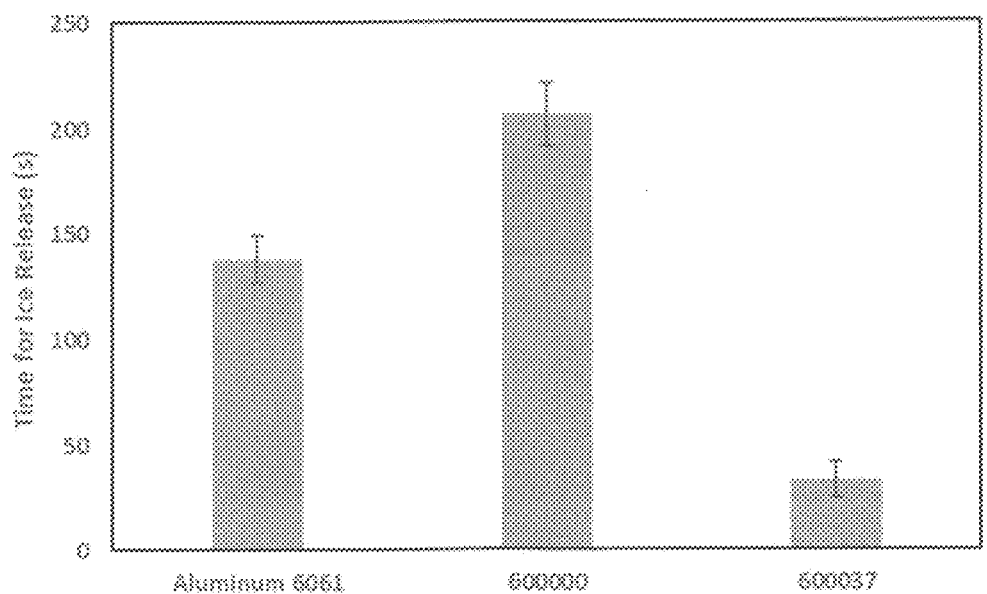
FIG. 16 shows representative data of time for release in the dynamic frosting test (see Examples for disclosure of the specification formulations designated in the figure).

FIG. 16 shows representative data of time for release in the dynamic frosting test with coupons coated with the indicated disclosed formulations. The data show that a coupon coated with formulation #600037, comprising AM-48, released ice significantly earlier than a coupon coated with formulation #600000, which did not contain any additive. Even though hydrophobic binders such as those used in formulation #600000 generally show good performance there appears to be an added benefit from using AM-48. Without wishing to be bound by a particular theory, it is believed that additive such as AM-48 improves the surface characteristics and results in better performance in terms of at least ice release.

It should be emphasized that the above-described aspects of the present disclosure are merely possible examples of implementations and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

What is claimed is:

1. A coating composition comprising a silica solgel and about 1 percent to about 25 percent by weight of a functionalized organosiloxane compound covalently bonded to the silica solgel wherein the percentage weight of the functionalized organosiloxane compound is a percentage of the total weight of silica particles in the silica solgel and the functionalized organosiloxane compound; and wherein the sidechain functionalized organosiloxane compound has a structure of

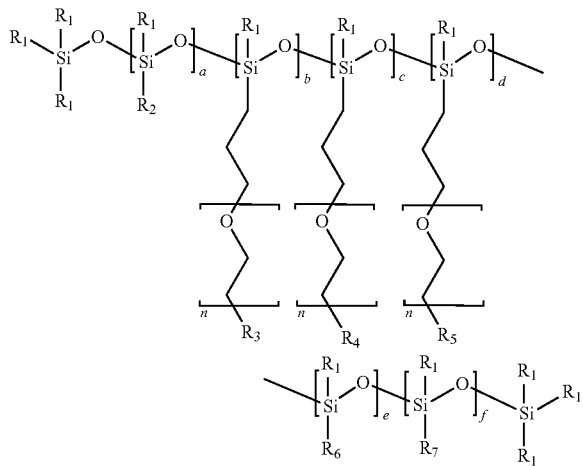

wherein $R_1$ is a alkyl, aryl, or fluoroalkyl; $R_2$ is an alkyl, trialkylsilane, polydimethyl siloxane, fluoroalkyl, polydiphenyl siloxane, or perfluoro polyether; $R_3$ is a reactive or non-reactive group selected from an OH, amine, NCO, epoxy, amide, carbamate, alkyl ester, or alkyl ether; $R_4$ is a zwitterionic group; $R_5$ is a polypropylene glycol or polybutylene glycol; $R_6$ is a trialkylsilane, alkyl, aryl, or fluoroalkyl; $R_7$ is a reactive group selected from alkyl silane, alkoxy silane, hydroxyl, amine, amide, epoxy, NCO, or carbamate; n is selected from 6, 7, 8, 9, 10, 11, 12, 13, 14, 15, 16, 17, 18, 19, 20, 21, 22, 23, 24, or 25; a is 0-30; b is 0-20; c is at least 1; d is 0-20; e is at least 1; and f is at least 1; and wherein a+b+c+d+e+f>1.

2. The sidechain functionalized organosiloxane compound according to claim 1, wherein n is 10.

3. The coating composition according to claim 1, wherein a is at least 1, c is at least 1, e is at least 1, and f is at least 1.

4. The coating composition according to claim 1, wherein a is at least 1, and c is at least 1.

5. The coating composition according to claim 1, wherein b is at least 1, c is at least 1, e is at least 1, and f is at least 1.

6. The coating composition according to claim 1, wherein a is at least 1, b is at least 1, c is at least 1, e is at least 1, and f is at least 1.

7. The coating composition according to claim 1, wherein a is at least 1, and b is at least 1.

8. The coating composition according to claim 1, wherein a is at least 1, b is at least 1, and d is at least 1.

9. The coating composition according to claim 1, wherein a is at least 1, and d is at least 1.

10. The coating composition according to claim 1, wherein $R_1$ is a C1-C12 alkyl, aryl, or C1-C12 fluoroalkyl.

11. The coating composition according to claim 1, wherein $R_1$ is a C1-C6 alkyl, aryl, or C1-C6 fluoroalkyl.

12. The coating composition according to claim 1, wherein $R_4$ is phosphorylcholine, sulfobetaine, or carboxybetaine.

13. The coating composition according to claim 12, wherein $R_4$ is phosphorylcholine.

14. The coating composition according to claim 12, wherein $R_4$ is sulfobetaine.

15. The coating composition according to claim 12, wherein $R_4$ is carboxybetaine.

16. The coating composition according to claim 1, wherein the trialkylsilane has a structure:

—(C1-C12)-Si(C1-C6)$_3$.

17. The coating composition according to claim 16, wherein the trialkylsilane has a structure:

—(CH$_2$)$_3$—Si(C1-C3)$_3$, or —(CH$_2$)$_6$—Si(C1-C3)$_3$.

18. The coating composition according to claim 16, wherein the trialkylsilane has a structure:

—(CH$_2$)$_3$—Si(CH$_3$)$_3$.

19. The coating composition according to claim 1, wherein the trialkoxysilane has a structure:

—(C1-C12)-Si(OC1-C6)$_3$.

20. The coating composition according to claim 19, wherein the trialkoxysilane has a structure:

—(CH$_2$)$_3$—Si(OC1-C3)$_3$, or —(CH$_2$)$_6$—Si(OC1-C3)$_3$.

21. The coating composition according to claim 19, wherein the trialkoxysilane has a structure:

—(CH$_2$)$_3$—Si(OCH$_3$)$_3$.

* * * * *